United States Patent
Uchimura et al.

(10) Patent No.: US 6,739,599 B1
(45) Date of Patent: May 25, 2004

(54) MOLDING AND METHOD AND DEVICE FOR MANUFACTURING THE MOLDING

(75) Inventors: Fumiaki Uchimura, Obu (JP); Yukihiko Yada, Obu (JP); Shunji Yamada, Obu (JP)

(73) Assignee: Tokai Kogyo Co., Ltd., Obu (JP)

( * ) Notice: Subject to any disclaimer, the term of this patent is extended or adjusted under 35 U.S.C. 154(b) by 139 days.

(21) Appl. No.: 09/869,646

(22) PCT Filed: Nov. 2, 2000

(86) PCT No.: PCT/JP00/07777

§ 371 (c)(1),
(2), (4) Date: Jul. 5, 2001

(87) PCT Pub. No.: WO01/32471

PCT Pub. Date: May 10, 2001

(30) Foreign Application Priority Data

Nov. 5, 1999 (JP) .......................................... 11/315691
Dec. 27, 1999 (JP) .......................................... 11/371517

(51) Int. Cl.⁷ ................................................ F16J 15/02
(52) U.S. Cl. ...................... 277/628; 277/644; 277/651; 277/906; 264/148; 428/31
(58) Field of Search ................................. 264/148, 146, 264/266, 275, 296; 428/31; 277/628, 644, 650, 651, 652, 654, 906

(56) References Cited

U.S. PATENT DOCUMENTS

| | | | | | |
|---|---|---|---|---|---|
| 4,911,959 | A | * | 3/1990 | Miyakawa | 428/31 |
| 4,965,103 | A | * | 10/1990 | Roberts et al. | 428/31 |
| 5,227,108 | A | * | 7/1993 | Reid et al. | 264/148 |
| 5,419,863 | A | * | 5/1995 | Henderson | 264/148 |
| 5,529,650 | A | * | 6/1996 | Bowers et al. | 156/64 |
| 5,709,912 | A | * | 1/1998 | Goto et al. | 428/31 |

FOREIGN PATENT DOCUMENTS

| | | |
|---|---|---|
| JP | A 59-8523 | 1/1984 |
| JP | A 59-48137 | 3/1984 |
| JP | A 62-169614 | 7/1987 |
| JP | A 62-204927 | 9/1987 |
| JP | 0 294 337 A1 | 12/1988 |
| JP | A 10-235709 | 9/1998 |
| JP | A 11-151744 | 6/1999 |
| JP | A 11-207800 | 8/1999 |

* cited by examiner

*Primary Examiner*—Anthony Knight
*Assistant Examiner*—E Peavey
(74) *Attorney, Agent, or Firm*—Oliff & Berridge, PLC

(57) ABSTRACT

The present invention provides elongated moldings in which the occurrence of unintended curves is prevented and which can be installed while accurately conforming to the shape of the installation area. The molding body (121) of the elongated molding (120) provided by the present invention is formed by joining, in at least some parts in its longitudinal direction, two or more plastic molded members having mutually different mold shrinkage rates; in at least some parts of the molding body consisting of said two or more plastic molded members, two or more curved areas (120a, 120b, and 120c) having mutually different curvatures are formed adjacently to each other in the longitudinal direction; and the configuration within the cross section of the two or more plastic molded members, which can be seen in the cross section of the molding body, varies between two adjacent curved areas among said two or more curved areas.

9 Claims, 36 Drawing Sheets

MOLDING AND METHOD AND DEVICE FOR MANUFACTURING THE MOLDING

TECHNICAL FIELD

The present invention relates to elongated moldings to be installed in the roof of a vehicle, etc., as well as manufacturing methods and manufacturing devices for such elongated moldings.

BACKGROUND ART

As shown in FIG. 42, various types of long and narrow moldings (hereafter referred to as "elongated moldings") are installed in a vehicle 50, such as an ordinary automobile, in order to fill gaps between components or for decorative purposes. For example, a so-called roof molding 60 is fitted and installed within the side grooves 52a formed along the edges of the roof (roof panel) 52 of the vehicle body 51. A window molding 55 is installed around the perimeter of the front window panel 53 in order to fill the gap between the window panel 53 and the window perimeter 53a formed along the vehicle body 51.

As shown in FIG. 45, the vehicle molding 60 (this figure shows a roof molding) typically consists of a plastic molded member 61, which constitutes the molding body 61a, and a metal core 66 which is embedded inside the molded member 61. Molding body 61a consists of a decorative area 62, which is exposed to the surface of the installation area to form the design surface 62a, and a mounting portion 65 to be installed in said installation area. Furthermore, the mounting portion 65 consists of a leg 63 to be inserted into the installation area (side grooves 52a of roof 52 in this case) and a securing portion 64 for securing the molding to said installation area. On the other hand, core 66 consists of a highly rigid metal, alloy, or hard resin material, whose cross section has typically been formed into a round wire shape, flat shape, or other different shapes such as a substantially U or L shape. Embedding such core 66 into molding body 61a improves the shape stability of molding 60 itself, thus improving the working efficiency of transportation and installation workers.

Such elongated molding 60 is usually manufactured by extruding an elastic molding material, such as a synthetic resin, elastomer, vulcanized rubber, etc., into a long and narrow shape. That is, as shown in FIG. 43, such elongated molding 60 can be manufactured using a manufacturing device (extrusion molding machine) equipped with an extrusion mold (die) 70 having a predetermined shape. In this figure, a molding material, such as a synthetic resin, is injected into extrusion mold 70 through supply tubes 72 and 74 that are connected to the mold 70. Then, the material is extruded through a predetermined extrusion port 73 in order to yield an elongated plastic molded member 61 (i.e., molding body) that has been extrusion-molded according to the shape of the extrusion port 73. Note that in this figure, a so-called two-color molding can be manufactured by supplying different molding materials from the two supply tubes 72 and 74.

Moreover, as shown in FIG. 43, by separately providing a core material introduction port 75 within the mold 70, a rigid core material 66 is introduced into the mold 70 along the longitudinal direction of molding body 61a that is extrusion-molded. In this way, an ordinary elongated molding 60 can be obtained with the core material 66 embedded inside the molded member 61 along the longitudinal direction.

However, accurately installing the aforementioned conventional molding in the predetermined installation area presents two problems that are described below.

The core material causes the first problem. That is, an elongated molding having the core material is embedded in the longitudinal direction presents the problems described below.

That is, molding body 61 that is conventionally extruded from extrusion port 73 has a linear shape as shown in FIG. 43. Because the core material 66 is embedded as was explained above, the rigidity of the core material 66 causes the molding to maintain a linear shape. Consequently, it is not easy to bend molding 60 to a desired configuration or angle, and it takes time to fit molding 60 into the shape of an installation area having complicated contours, such as roof side grooves 52a and the window perimeter 53a of vehicle 50 shown in FIG. 42.

Furthermore, roof 52 and body 51 of vehicle 50 have unique curved surfaces depending on the model and therefore, roof molding 60, etc. must also be bent (including twisting and flexing. Hereafter, "bending" shall mean such a process.) to conform to those curved surfaces for installation. However, it has been difficult to bend conventional roof moldings 60, in which a highly rigid core material is embedded, to conform accurately to the shape of the roof 52, etc. A typical example is shown in FIG. 44. Note that this figure shows a cross-section of the roof molding 60 along the portion that is inserted into side grooves 52a.

As shown in FIG. 44, for a conventional long roof molding 60 in which the core material 66 is embedded, it has been difficult to install the molding 60 such that it accurately matches the bending direction (traveling line) of roof side grooves 52a. That is, because it is not easy to bend roof molding 60 in the desired direction in different spots in order to match the contour of roof side grooves 52a, problems have occurred in some cases in which molding 60 becomes offset with respect to the outer wall 52b of side grooves 52a in some areas while it becomes offset with respect to the inner wall 52c of side grooves 52a in other areas. This kind of poor match between the formation direction (traveling line) of the molding installation area (e.g., roof side grooves 52a) and the bending direction (traveling line) of the molding, i.e., a traveling line mismatch, detracts from the appearance and thus is not desirable in terms of product value.

The second problem is caused by the configuration of the molding body. That is, in recent years, the need for improved vehicle designs has resulted in requirements for improved decorative characteristics and the appearance of the elongated molding that is installed on the exterior surfaces of vehicles. Consequently, as shown in FIG. 45, a molded member having a different composition from the molded member, which comprises the interior of decorative area 62 or mounting portion 65, is typically utilized for design surface 62a of decorative area 62 in order to achieve improved scratch resistance and luster. For example, in the case of roof molding 60 consisting of TPO (a thermoplastic elastomer from the polyolefin family), the design surface 62a is formed using a TPO that contains a large proportion of hard PP (polypropylene), whereas other areas are formed using a soft TPO that contains relatively less PP in order to achieve improved installation characteristics.

However, in a molding that consists of two or more kinds of molded members having different compositions as described above, the different compositions usually result in different mold shrinkage rates among the different molded members, resulting in the problem described below.

That is, as schematically shown in FIG. 46, if molding 80 is formed by laminating molded member 81, which has a relatively large molding shrinkage rate, and molded member 82, which has a relatively small molding shrinkage rate in the longitudinal direction, a linear shape can be maintained immediately following extrusion as shown on the top area in FIG. 46. However, after extrusion (typically during the cooling process), the different mold shrinkage rates of the two molded members 81 and 82 cause an unintended curvage (warpage) in molding 80 toward the member having the larger molding shrinkage rate.

When such an unintended curvage occurs, it becomes difficult to install the molding accurately in conformance with the contour (including surface configurations that are partially or entirely flat as well. Hereafter, "contour" shall mean such a surface configuration.) of the installation areas in the vehicle roof 52, etc. The external appearance of the installation areas is also spoiled, which is not desirable in terms of product value.

Therefore, the objective of the present invention is to provide elongated moldings that solve the aforementioned first and/or second problems and that has property of accurately conforming to the shapes of installation areas having complicated contours (hereafter referred to as "shape conformance"). That is, several of the inventions disclosed herein have been created to solve the aforementioned conventional problems relating to the shape conformance of the elongated molding to be installed/used in vehicle roofs, etc., and to provide moldings that can be easily curved or bent in the desired angle or orientation, a manufacturing method for easily manufacturing such molding, and a manufacturing device for that purpose.

Several of the inventions disclosed herein have been created to solve the aforementioned conventional problems relating to elongated moldings consisting of two or more kinds of molded members having different compositions, and to provide elongated molding that, despite being comprised of two or more molding members having different mold shrinkage rates, prevents the occurrence of an unintended curvature and that can be installed accurately in conformance to the installation areas, and a manufacturing method thereof.

DISCLOSURE OF INVENTION

The moldings of the present invention that achieve the aforementioned objective are moldings that have been formed into an elongated shape and the molding body is formed by joining two or more plastic molded members having mutually different mold shrinkage rates in at least some portions along the longitudinal direction. Furthermore, in at least some portions of the molding body consisting of said two or more plastic molded members, two or more curved areas having mutually different curvatures contact each other along the longitudinal direction. Moreover, the cross-sectional configuration of the two or more plastic molded members, which can be seen in the cross section of the molding body, varies between two adjacent curved areas among said two or more curved areas.

Note that in this Specification, "configuration within the cross section" means the pattern formed by the two or more plastic molded members (cross sections), which can be seen in the cross section relative to the longitudinal direction of the molding body. Therefore, the fact that the configuration within the cross section differs between two different cross sections of the molding body means that the patterns formed from the two or more plastic molded members (cross sections) (typically the positions and modes of the cross sections of individual plastic molded members) are mutually different.

Also, in this Specification, "molding shrinkage rate" refers to the degree of shrinkage that occurs in the plastic molded member after said molded member is molded (typically extrusion molding). "Curved area" is a term that refers to a part in the longitudinal direction, having any curvature, and is not restricted to one having a particular curvature. Therefore, a part that is substantially linear in the longitudinal direction and whose curvature is approximately 0, for example, is also included in the curved area described in this Specification.

In the molding of the present invention having such a configuration, curved areas having the different curvatures can be formed adjacent to each other by making the configuration within the cross section differ along the longitudinal direction of the molding body. In other words, in the molding of the present invention, curved areas having different curvatures can be formed in different areas of the molding body by intentionally varying the configuration within the cross section among different areas along the longitudinal direction of the molding body. This is because varying the configuration within the cross section can create different mold shrinkage rates at different areas along the longitudinal direction of the molding body accordingly since plastic molded members having different mold shrinkage rates are formed together into the molding body.

Therefore, according to the molding of the present invention, the bending direction and curvature of the molding itself can be varied (adjusted) for different areas in the longitudinal direction of the molding in correspondence to said mold shrinkage rates. Consequently, according to the molding of the present invention, despite the fact that multiple plastic molded members having mutually different mold shrinkage rates form the molding body, curvatures conforming to the shapes (contours) of the installation areas can be intentionally generated while preventing the generation of undesirable curvatures, thus realizing installation that accurately conforms to said installation areas.

One of the preferred embodiments of the molding of the present invention, in which the configuration within the cross section is varied between the aforementioned two adjacent curved areas (hereafter referred to as "the first molding of the present invention") has one plastic molded member comprising the molding body and another or two or more plastic molded members having mold shrinkage rates that are different from that of said first plastic molded member and that are embedded along the longitudinal direction of said first plastic molded member, wherein in at least parts of the molding body, the embedding positions of said other plastic molded members are varied such that the relative positions of the plastic molded members within the cross section of the molding body differ between the two adjacent curved areas.

Note that in this Specification, "the relative position within the cross section of the molding body" of the other plastic molded member refers to the positional relationship between the location of the cross section of the other plastic molded member existing within the cross section of the targeted molding body and a specific location in the cross section of the targeted molding body (one location on the perimeter of the cross section is typically chosen), as viewed from said specific location. Therefore, a statement that such a relative position varies along the longitudinal direction of the molding body, i.e., between the two adjacent curved areas, typically means that the position, where the cross-sectional shape of the other plastic molded member exists, varies sufficiently to be clearly recognizable between individual cross sections along the longitudinal direction of the molding body (i.e., the aforementioned two adjacent curved areas), as viewed from one specific location on the perimeter of the installation area (typically the leg area to be described below) of the molding body or on the decorative surface of the molding body.

In the first molding of the present invention having such a configuration, the embedded position of the other plastic molded member, as viewed from the cross section of the molding body, varies between predetermined areas along the longitudinal direction of the molding. That is, the offset state of the other plastic molded member, which is to be embedded along the longitudinal direction, within the cross section varies between said areas.

Additionally, in the first molding of the present invention, the aforementioned other plastic molded member is typically comprised of a molding material that is different from the molding material used for forming the first plastic molded member. Consequently, in the first molding of the present invention, curves or bends having different curvatures can be realized for individual areas of the molding body in correspondence to the offset status of said other plastic molded member. That is, the first and the other plastic molded members consisting of mutually different materials are formed together into the molding body, and as a result, a difference in shrinkage rates can be created based upon a difference in materials between the first plastic molded member and the other plastic molded member after the molding body is formed (cooling). During this step, varying the embedded location of the other plastic molded member within the cross section of the molding body for different areas along the longitudinal direction can vary (adjust) the bending direction of the molding body itself for each of said areas in correspondence to the difference in said shrinkage rates.

Therefore, according to the first molding of the present invention, a bending process that conforms to the shape of the installation area (contour) can be easily performed and installation that accurately conforms to said installation area can be realized.

In one of the preferred forms of the first molding of the present invention, the other plastic molded member consists of a molded member that is harder than the first plastic molded member. Molding having such a configuration can achieve a high level of shape stability equaling a conventional molding having a metal core.

In another preferred form of the first molding of the present invention, the other plastic molded member consists of a molded member that has a larger molding shrinkage rate than the first plastic molded member. A molding having such a configuration allows the molding body to be easily curved or bent in the direction in which the other plastic molded member formed from a material having said larger molding shrinkage rate is offset.

An especially preferred form of the first molding of the present invention is one in which at least some parts of the molding body in the longitudinal direction are curved or bent in the direction in which the other plastic molded member is offset, as viewed from the cross section of the molding body. Such non-linear molding can achieve a high degree of shape conformance to the contour of the installation area.

Still another preferred form of the molding of the present invention (hereafter referred to as "the second molding of the present invention"), in which the configuration within the cross section is varied between the two adjacent curved areas, is characterized in that the locations of the two or more plastic molded members and/or their area proportions on the cross section of the molding body vary between the two adjacent curved areas.

In the second molding of the present invention having such a configuration, a form in which the curved areas having different curvatures are adjacent to each other can be realized by varying the locations and/or area proportions of the two or more plastic molded members having mutually different mold shrinkage rates, as viewed from the cross section of the molding body, along the longitudinal direction.

That is, the second molding of the present invention realizes the formation of curved areas having different curvatures in individual areas of the molding body by intentionally varying the locations and/or area proportions. This is because plastic molded members having individually different mold shrinkage rates are formed together into the molding body, and as a result, differences in mold shrinkage rates can be created for individual areas, as viewed from the cross section of the molding body, in correspondence to the locations and area proportions of individual plastic molded members after the molding body is formed (cooling). Moreover, by varying the locations and/or area proportions of such multiple plastic molded members for individual positions along the longitudinal direction, the bending direction and curvature of the molding itself can be varied (adjusted) for individual positions in correspondence to the differences in said mold shrinkage rates.

Therefore, according to the second molding of the present invention, despite the fact that the molding body consists of a plurality of plastic molded members having mutually different mold shrinkage rates, curvatures conforming to the shapes (contours) of the installation areas can be intentionally generated while preventing the generation of undesirable curvatures, thus realizing installation that accurately conforms to said installation areas.

In one embodiment of the second molding of the present invention, the molding body is configured by joining the two or more plastic molded members in the longitudinal direction over its entire length. According to such a molding, it is possible to intentionally generate curvatures conforming to the shapes (contours) of the installation areas over the entire longitudinal direction.

In another embodiment of the second molding of the present invention, at least one of the curved areas forms a linear molded part that maintains a substantially linear shape in the longitudinal direction. According to such a molding, it is possible to realize an installation that accurately conforms to the installation area even if some parts of the installation area have flat shapes (contours).

In one of the preferred forms of the second molding of the present invention, between at least one pair of adjacent curved areas among the curved areas, one of the two or more plastic molded members comprising said curved areas is distributed and positioned in two or more locations that are separated from each other within the cross section of the molding body, wherein the area proportion of said one plastic molded member in at least one location of said two or more locations, within the cross section of the molding body, is different between said two curved areas.

In the second molding of the present invention having such a characteristic, by varying the area proportion (i.e., the position and mass proportion) of the one plastic molded member, which is distributed and positioned in two or more locations, along the longitudinal direction, two or more curved areas having mutually different curvatures can be easily formed adjacent to each other in the longitudinal direction.

In another preferred form of the second molding of the present invention, between at least one pair of adjacent curved areas among the curved areas, the area proportions of at least two of the two or more plastic molded members comprising said curved areas, within the cross section of the molding body, are substantially the same between said two curved areas, and the locations of said at least two plastic molded members within the cross section of the molding body are different from each other between said two curved areas.

In the second molding of the present invention having such a characteristic, by varying the locations (i.e., positions) of the two or more plastic molded member having mutually different values for the mold shrinkage rates along the longitudinal direction, two or more curved areas having mutually different curvatures can be easily formed adjacent to each other in the longitudinal direction.

In still another preferred form of the second molding of the present invention, between at least one pair of adjacent curved areas among the curved areas, two or more plastic molded members comprising said curved areas contain a first plastic molded member having a relatively large molding shrinkage rate and a second plastic molded member having a relatively small molding shrinkage rate, wherein the locations of said first and second plastic molded members within the cross section of the molding body in said two curved areas are offset by 180 degrees from each other between said two curved areas, as viewed from said cross section (i.e., said first and second plastic molded members are rotated from each other by approximately 180 degrees across the two curved areas, using the longitudinal direction of one of the curved areas as the rotation axis).

In the molding having such a characteristic, first and second molded members having the mutually different mold shrinkage rates are alternately positioned between two curved areas that are adjacent in the longitudinal direction. That is, the locations of these two plastic molded members within the cross section of the molding body are different from each other between the two curved areas in the transverse direction (i.e., the right-left direction, up-down direction, and other direction perpendicular to the longitudinal direction. Hereafter, "transverse direction" shall mean such directions.). Consequently, it is possible to alternate the bending direction in one curved area and the bending direction in the other curved area in the transverse direction (typically in an approximate S shape). Therefore, according to the molding in the present format, it is possible to realize L installation that accurately conforms to an installation area that is curved in an S shape in the left-right or top-down direction.

Furthermore, the present invention provides molding in another configuration that can achieve the aforementioned objective (hereafter referred to as "the third molding of the present invention"). That is, the third molding of the present invention is molding that is formed in a long shape, and its molding body is formed by joining two or more plastic molded members having mutually different mold shrinkage rates in at least some parts in the longitudinal direction. Furthermore, a linearly molded area that substantially maintains a linear shape in the longitudinal direction is formed in at least some parts of the molding body comprised of said two or more plastic molded members, wherein one or more of the two or more plastic molded members are distributed and positioned in two or more locations that are separated from each other within the cross section of the molding body in said linearly molded area such that the molding shrinkage rate in said linearly molded area in the longitudinal direction is nearly uniform over the entire cross section of the molding body.

The third molding of the present invention having such a configuration can maintain linearity after molding while preventing the aforementioned unintended curvage (warpage) shown in FIG. 46, in the linearly molded area. That is, the molding body is formed by integrating together plastic molded members having different mold shrinkage rates, and as a result, the molding shrinkage rate differs in each area within the cross section of the molding body in correspondence to the location and area proportion of each plastic molded member. In this process, the third molding of the present invention specifies the locations and area proportions of the individual plastic molded members such that the molding shrinkage effects of individual plastic molded members in the linearly molded area can counteract each other as a whole, i.e., so that a bias in molding shrinkage is not created that would bend the molding body in one particular direction.

Therefore, according to the molding having the present configuration, despite the fact that at least part of the molding body is comprised of plural plastic molded members having mutually different mold shrinkage rates, linearity can be substantially maintained in the longitudinal direction in said area. Therefore, installation that accurately conforms to an installation area having a flat surface can be realized.

A preferred form of the molding of the present invention is formed from synthetic resin materials that have mutual compatibility and can be fused together during the molding of the two or more plastic molded members comprising the molding body. According to such a configuration, strong bonding between molded members can be achieved even after mold shrinkage has occurred.

A preferred form of the molding of the present invention (including the aforementioned first, second, and third molding of the present invention) is formed as roof molding to be installed in the installation area formed on the roof of a vehicle, and in which curves or bends have been formed in correspondence to the contour of said installation area.

Molding having such a configuration can realize shape conformance, i.e., conformance to the contour unique to a vehicle, and can be installed while accurately conforming to the roof shape (contour) of the vehicle.

As another aspect of achieving the aforementioned objective, the present invention provides a method of manufacturing the first molding of the present invention.

That is, the molding manufacturing method of the present invention (hereafter referred to as "the first molding manufacturing method of the present invention") is a method of manufacturing elongated molding that has a plastic molded member comprising the molding body and another or two or more plastic molded members embedded along the longitudinal direction of said first plastic molded member, and includes (a) a process for supplying to the interior of an extrusion mold, a molding material for forming the plastic molded member comprising the molding body and a molding material that is different from said first molding material and that comprises another plastic molded member embedded inside said first plastic molded member, and (b) a process for extruding from the extrusion port of said extrusion mold, a molding body in which said other molding material is embedded in the longitudinal direction. Moreover, an operation for varying the embedded position of said another molding material and/or an operation for moving the position of said extrusion port are included such that the relative position of the other molding material within the cross section of the molding body varies along the longitudinal direction at predetermined timing.

According to the molding manufacturing method of the present invention having such a configuration, the embedding position of the other molding material (i.e., the other plastic molded member) to be embedded in the molding body can be offset in mutually different orientations between different parts along the longitudinal direction. Consequently, the first molding manufacturing method of the present invention can ideally manufacture the first molding of the present invention having the aforementioned various characteristics.

A preferred embodiment of the first molding manufacturing method of the present invention is a method in which the operation for varying the embedding position of the aforementioned other molding material and/or the aforementioned operation for moving the extrusion port are performed multiple times at different timings during the extrusion molding of a single piece of elongated molding body.

With such a manufacturing method, the embedding position of the other molding material (the other plastic molded member) to be embedded in the molding body can be offset as desired for each part along the longitudinal direction. According to the manufacturing method in this embodiment, molding can be manufactured in which a curve or bend having a different curvature (radius of curvature) according to the offset state is formed for each part of the molding body in the longitudinal direction. Consequently, this method can provide the molding of the present invention, which has superior shape conformance to the contours of the installation areas of a vehicle, etc., where the molding is to be installed.

As another aspect of achieving the aforementioned objective, the present invention provides a device for manufacturing the first molding of the present invention.

The molding manufacturing device of the present invention is a device for manufacturing elongated molding, and is provided with an extrusion mold having an extrusion port for extruding a molding material supplied from outside with a predetermined cross-sectional shape; and the extrusion mold is provided with a molding material supply area for supplying a molding material, which is used for forming the plastic molded member comprising the molding body, into said mold and with another or two or more molding material supply areas for supplying the other molding material(s), which is to be embedded in said first plastic molded member, into said mold. Moreover, the extrusion mold is configured to extrude from the extrusion port, the molding body in which the other molding material supplied from the other molding material supply area is introduced into and embedded in the first molding material supplied from the first molding material supply area. Furthermore, an embedding position varying means for varying the embedding position of said other molding material is provided such that the relative position of the other molding material to be extruded from the extrusion port, within the cross section of the molding body, can be varied along the longitudinal direction.

The molding manufacturing device of the present invention having such a configuration can be used for ideally implementing the first molding manufacturing method of the present invention. That is, the first molding material comprising the first plastic molded member and the other molding material comprising the other plastic molded member can be individually and separately supplied to the extrusion mold for the molding. Then, the molding body, in which the other molding material supplied into the mold is embedded in the first molding material, can be extruded from the extrusion port. In this way, it becomes possible to manufacture elongated molding that has the another or two or more plastic molded members embedded in the first plastic molded member comprising the molding body.

During this step, because the embedding position varying means is provided, the molding manufacturing device of the present invention can vary and offset along the longitudinal direction, the embedding positions of the other molding material (the other plastic molded member) to be embedded in the molding body, which is to be extruded from the extrusion port. Therefore, the molding manufacturing device of the present invention can ideally manufacture the first molding of the present invention having the aforementioned various characteristics.

In one of the preferred embodiments of the molding manufacturing device of the present invention, the extrusion mold is provided with another molding material introduction port for introducing the other molding material while it is embedded in the first molding material supplied into the mold from the first molding material supply area. Moreover, said extrusion mold and the other molding material introduction port are installed such that the position of the face of said other molding material introduction port can be varied relative to the extrusion port.

With such a configuration, the embedding position of the aforementioned other molding material can be varied by varying the aforementioned position of the face.

A more preferred molding manufacturing device of the present invention is a manufacturing device that is configured to change the aforementioned position of the face reversibly and continuously.

With such a manufacturing device, the embedding positions of the other or two or more molding materials (the other or two or more plastic molded members) to be embedded in the molding body can be offset as desired for each part along the longitudinal direction. Therefore, the manufacturing device in this embodiment can ideally manufacture the molding of the present invention, which has superior shape conformance to the contours of the installation areas of a vehicle, etc., where the molding is to be installed.

As another aspect of achieving the aforementioned objective, the present invention provides a method of preferably manufacturing the second molding of the present invention.

That is, such a molding manufacturing method of the present invention (hereafter referred to as "the second molding manufacturing method of the present invention") is a method of manufacturing elongated molding in which two or more curved areas having mutually different curvatures can be formed adjacent to each other in the longitudinal direction after extrusion molding, and includes (a) a step of supplying to the extrusion mold, two or more plastic molded member molding materials whose post-molding mold shrinkage rates are different from each other, and (b) a step of extruding from the extrusion port of said extrusion mold, a molding body formed by joining said two or more plastic molded member molding materials, wherein, during the execution of processes (a) and (b), an operation for varying the locations and/or area proportions of the two or more plastic molded member molding materials within the cross section of the molding body to be extruded from the extrusion port is performed once or two or more times such that two or more curved areas having mutually different curvatures are formed adjacent to each other in the formed molding body in the longitudinal direction.

According to the molding manufacturing method of the present invention having such a characteristic, the varying operation during extrusion molding can mutually vary the locations and/or area proportions of the two or more plastic molded members comprising the molding body, as viewed from the cross section of the molding body, in different parts along the longitudinal direction. During this step, curved areas having the desired orientations and curvatures are formed by varying the locations and/or area proportions such that the mold shrinkage rate of the molding body varies along the transverse direction. This is because the extruded molding body is bent in the direction of the larger mold shrinkage rate according to the difference in said mold shrinkage rates.

Consequently, the molding manufacturing method of the present invention having such a configuration can preferably manufacture the molding of the present invention.

In one of the preferred embodiments of the second molding manufacturing method of the present invention, one of the plastic molded member molding materials to be supplied to the mold is supplied to said mold so as to be distributed and positioned in two or more mutually separate locations within the cross section of the molding body, wherein at least one of the aforementioned one or two or more varying operations is an operation for varying the area proportion of said first plastic molded member molding material within the cross section of the molding body in at least one of said two or more locations before and after said varying operation.

According to a molding manufacturing method having such a characteristic, by varying the area proportion (i.e., location and mass proportion) of the first plastic molded member molding material that is distributed and positioned in the two or more locations along the longitudinal direction, a molding whose bending direction and/or curvature varies along the longitudinal direction can be preferably manufactured.

In one of the preferred embodiments of the second molding manufacturing method of the present invention, at least one of the aforementioned one or two or more varying operations is an operation for alternately positioning different plastic molded member molding materials of said two or more plastic molded member molding materials after said varying operation, in the locations where the two or more plastic molded member molding materials were positioned within the cross section of the molding body before the varying operation.

A molding manufacturing method having such a characteristic can preferably manufacture a molding in which its bending direction and/or curvature varies along the longitudinal direction, by alternating the locations of the two or more plastic molded members having the aforementioned different mold shrinkage rates for each curved area.

In another preferred embodiment of the second molding manufacturing method of the present invention, the plastic molded member molding materials to be supplied to the mold include a first plastic molded member molding material having a relatively large post-molding mold shrinkage rate and a second plastic molded member molding material having a relatively small post-molding mold shrinkage rate, wherein at least one of the aforementioned one or two or more varying operations is an operation for rotating the locations of said two plastic molded member molding materials within the cross section of the molding body by approximately 180 degrees in relative terms as viewed from said cross section.

A molding manufacturing method having such a characteristic can preferably manufacture the molding in which the bending direction in one of adjacent curved areas and the bending direction in the other curved area are alternated in the transverse direction (typically in an approximate S shape).

In a particularly preferred embodiment of the second molding manufacturing method of the present invention, the change in the area proportion by the varying operation is achieved by adjusting (varying as needed) the flow rates of the two or more plastic molded member molding materials to be supplied to the extrusion mold (die). That is, when the flow rate (i.e., the supply volume per unit time) of each plastic molded member molding material is varied, the area proportion of each molding material within the cross section of the molding body to be extruded varies in response.

In another particularly preferred embodiment of the second molding manufacturing method of the present invention, the change in the location during the varying operation is achieved by switching the channels for the two or more plastic molded member molding materials inside said extrusion mold by moving part of the extrusion mold. By using such a movable-type extrusion mold, the location swapping can be smoothly performed.

Another molding manufacturing method of the present invention for achieving the aforementioned objective (hereafter referred to as "the third molding manufacturing method of the present invention") includes (a) a step of supplying to an extrusion mold, two or more plastic molded member molding materials having mutually different post-molding mold shrinkage rates, and (b) a step of extruding from the extrusion port of said extrusion mold, a molding body formed by joining said two or more plastic molded member molding materials, wherein steps (a) and (b) are performed such that one or more of the aforementioned two or more plastic molded member molding materials are distributed and positioned in two or more locations that are separated from each other within the cross section of the molding body, to make the molding shrinkage rate in the longitudinal direction of the molding body after molding over the entire cross section of the molding body nearly uniform at least part of the time.

The third molding manufacturing method of the present invention having such a configuration can preferably manufacture the third molding of the present invention, in which a linear molded area that maintains a substantially linear shape in the longitudinal direction in at least some area in the longitudinal direction after extrusion molding is formed.

As explained above, the present invention can provide a molding in which partial curves or bends having different curvatures can be easily achieved and a manufacturing method thereof. With this molding, curves or bends having different curvatures can be easily obtained for each area along the longitudinal direction, and as a result, the molding can be easily installed in conformance to the installation areas having complicated contours, such as the perimeters of window panels and roof-side grooves of a vehicle.

Furthermore, the present invention can provide an elongated molding that can be installed in excellent conformance to the shape of the installation area and a manufacturing method thereof, while preventing the generation of unintended curves despite the fact that the elongated molding consists of two or more molded members having different mold shrinkage rates. With this molding, curved areas having different curvatures can be easily formed adjacent to each other in the longitudinal direction based upon the post-molding shrinkage effects, and as a result, the molding can be easily installed in conformance to the installation areas having complicated contours, such as the perimeters of window panels and roof-side grooves of a vehicle.

Moreover, these types of molding of the present invention can realize an installation that accurately conforms to the shape of the predetermined installation area, and as a result, can improve the appearance of the installation state and can dramatically increase the product value of vehicle molding, etc.

BEST MODES FOR PRACTICING THE INVENTION

Figure 1:
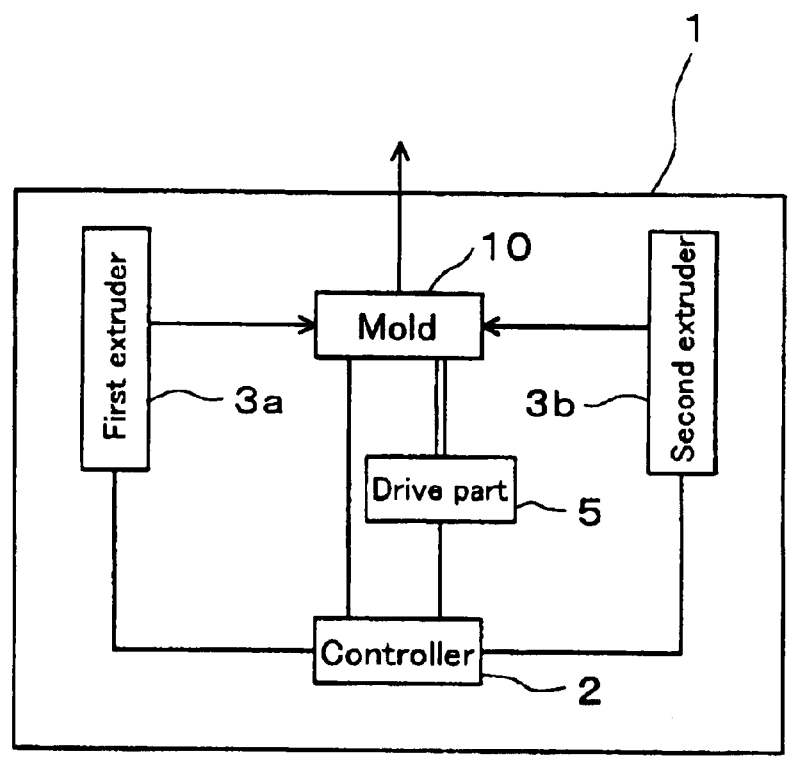
FIG. 1 is a block diagram that shows the configuration of the molding manufacturing device relating to an embodiment of the present invention.

Preferred embodiments for implementing the present invention will be explained below. The moldings of the present invention (elongated molded body) are not limited to any particular application or shape as long as two or three or more plastic molded members having mutually different mold shrinkage rates are joined in the longitudinal direction in at least some portions of the molding body in the longitudinal direction, and at the same time, two or three or more curved areas having mutually different curvatures are formed adjacent to each other in the longitudinal direction in some or all portions of the molding body in the longitudinal direction. As explained above, in the moldings of the present invention, curved areas are formed by varying the configuration within the cross section of the plural plastic molded members within the cross section of the molding body along the longitudinal direction. Because such curved areas are formed, the moldings of the present invention have excellent shape conformance and can be ideally used, in particular, as moldings that are installed in vehicles having complicated contours.

First, the first molding of the present invention is not limited to any particular application or shape as long as one or plural plastic molded members are embedded in the plastic molded member comprising a elongated molding body (Hereafter, one or plural plastic molded members to be thus embedded shall be generally referred to as "insertion members."), and at the same time, the embedding positions of said insertion members are varied/offset such that the relative positions of the insertion members within the cross section of the molding body are mutually different in at least some portions along the longitudinal direction. As explained above, the first molding of the present invention has a structure that is curved (or bent) in correspondence to the offsetting of the embedding positions of said insertion members or that can be easily curved (or bent) based upon said offset. Therefore, the first molding of the present invention has excellent shape conformance and can be ideally used especially as a molding that will be installed in vehicles having complicated contours.

For example, said molding is especially suited as a roof molding that is inserted/installed in side grooves provided near the edges of a vehicle roof, or as a window molding that is installed around the perimeter of a window panel that will be installed in a vehicle.

Any molding material that has conventionally been used to make moldings for vehicles can be used without restriction as the molding material that forms the plastic molded member of the molding body (Hereafter, the molding material relating to the first molding of the present invention shall be referred to as the "body molding material."). Typically, the body molding material can be selected from among synthetic resin materials, such as hard or soft polyvinyl chloride resins, ABS resins, various types of olefin or styrene elastomers, and appropriate blends of these materials.

Further, although no particular restrictions are placed on the insertion members of the present invention as long as they can be embedded in the body molding material while varying the relative positions using a technique such as extrusion molding, those insertion members that have a high level of adhesion strength (adhesion affinity) to the body molding material, i.e. that are difficult to separate from the body molding material after molding, are preferred. Use of a relatively hard material is preferable in order to maintain the shape stability of the molding itself at a high level. A long rod- or band-shaped hard plastic material (e.g., a band, cord, rod, etc. made of polypropylene, or high-or medium-density polyethylene) preferably can be used as such a material.

In the alternative, synthetic resin molding materials that can be extrusion-molded together with the body molding material are also preferred as the molding materials for making the insertion members (hereafter referred to as "insertion materials"). Preferably, polyvinyl chloride resins, polyamide resins, polycarbonate resins, ABS resins, polypropylene resins, PET resins, various types of olefin, styrene, or polyester elastomers, and appropriate blends of these materials can be used as such synthetic resin materials. Furthermore, FRTP molding materials containing various reinforcements (glass fibers, carbon fibers, aramid fibers, etc.) in a base material (matrix) consisting of these thermoplastic resins can also be preferably used as insertion materials. Use of a relatively hard resin material is preferable in order to maintain a high level of shape stability. Although such materials may differ depending on the body molding material that is selected, the insertion materials can include polycarbonate resins, ABS resins, polypropylene resins, PET resins and FRTP molding materials containing various reinforcements. For example, if a polyvinyl chloride resin, ABS resin, or any of various types of elastomers is used as the body molding material, it is preferable to use a polycarbonate resin, polypropylene resin, or ABS resin as the insertion material, all of which can form a harder molded body. Such combinations can further improve the shape stability of the molding body.

Note that it is preferable to select the body molding material and the insertion material (synthetic resin molding material) by focusing on the mold shrinkage rate difference in particular. This is because when a large mold shrinkage rate difference exists between the body molding material and the insertion material, curves or bends that correspond to the offset in the embedding position of the insertion member can be more appropriately realized in the molding body.

In this case, it is especially preferable to use a synthetic resin molding material as the insertion material, which has a larger mold shrinkage rate than the body molding material that will be used together with the insertion material. In this way, the molding body can be curved or bent in the embedding direction (offset direction) according to the shrinkage rate of the insertion material after molding (cooling). An excellent example of such a combination will be to use a polyvinyl chloride resin as the body molding material, which has a relatively small mold shrinkage rate, and to use an ABS resin, polycarbonate resin, polypropylene resin, or polyester elastomer, etc. as the insertion material. Such a combination allows the molding body after molding/cooling to be easily curved (or bent) in the direction in which the insertion member is offset. Combinations that have preferred molding temperatures within a nearly equal range will be even more preferable.

The second molding of the present invention is not limited to any particular application or shape as long as two or three or more plastic molded members having mutually different mold shrinkage rates are joined along the longitudinal direction in at least some portions of the molding body in the longitudinal direction, and at the same time, two or three or more curved areas having mutually different curvatures are formed adjacent to each other along the longitudinal direction in some or all portions of the molding body in the longitudinal direction. As explained above, in the second molding of the present invention, curved areas are formed by varying the locations and/or area proportions of the plural plastic molded members within the cross section of the molding body along the longitudinal direction. Because such curved areas are formed, the second molding of the present invention has excellent shape conformance and can be preferably used, in particular, as a molding that will be installed in vehicles having complicated contours.

Examples of a typical combination of two or more plastic molded members that have mutually different mold shrinkage rates and that relate to the second or third molding of the present invention include a combination of two or more kinds of TPO having different compositions in which the content of PP as a hard component is different, a combination of two or more kinds of polyvinyl chloride resin (PVC) having different hardness, etc. A combination of TPO and PVC having mutually different mold shrinkage rates is also preferable. For example, the present invention is preferably embodied as a roof molding for an automobile, in which the surface of the decorative area is made of a hard TPO while the rest of the decorative area and the installation area are made of relatively soft PVC. When the molding body is made of plural plastic molded members comprised of such molding materials having different characteristics, it is preferable to form these plural plastic molded members using molding materials that have mutual compatibility and that can be fused together in order to prevent the plastic molded members that comprise the molding body from delaminating (i.e., increasing the adhesion strength). For example, such fusing can be realized by using resin materials that include various compatibility-enhancing agents.

Note that a core material can be embedded in the second or third molding of the present invention without any special restrictions. For example, embedding a metal core, e.g., one having a circular wire shape or plate shape, in the molding body is preferable in order to ease the extraction operation during the extrusion process.

The moldings of the present invention can be formed/manufactured using various kinds of ordinary resin molding techniques. Although not necessarily limited to it, the most preferred manufacturing method is extrusion molding. This method can easily form elongated moldings having the desired shape (cross section) according to the extrusion shape of the extrusion mold. Note that the principles and the basic procedures for such resin molding techniques are well-known in this field, and do not characterize the present invention, and therefore, a detailed explanation is omitted.

In the molding of the present invention thus obtained, curves or bends can be created by means of natural cooling after molding, forced cooling, or heat treatment, which curves or bends are determined based upon the shrinkage rate difference, and the curvature corresponds to the degree of offset in the insertion member embedding position.

Moreover, the process can create curves having curvatures that correspond to the locations and area proportions of the two or three or more plastic molded members within the cross section of the molding body.

Figure 2:
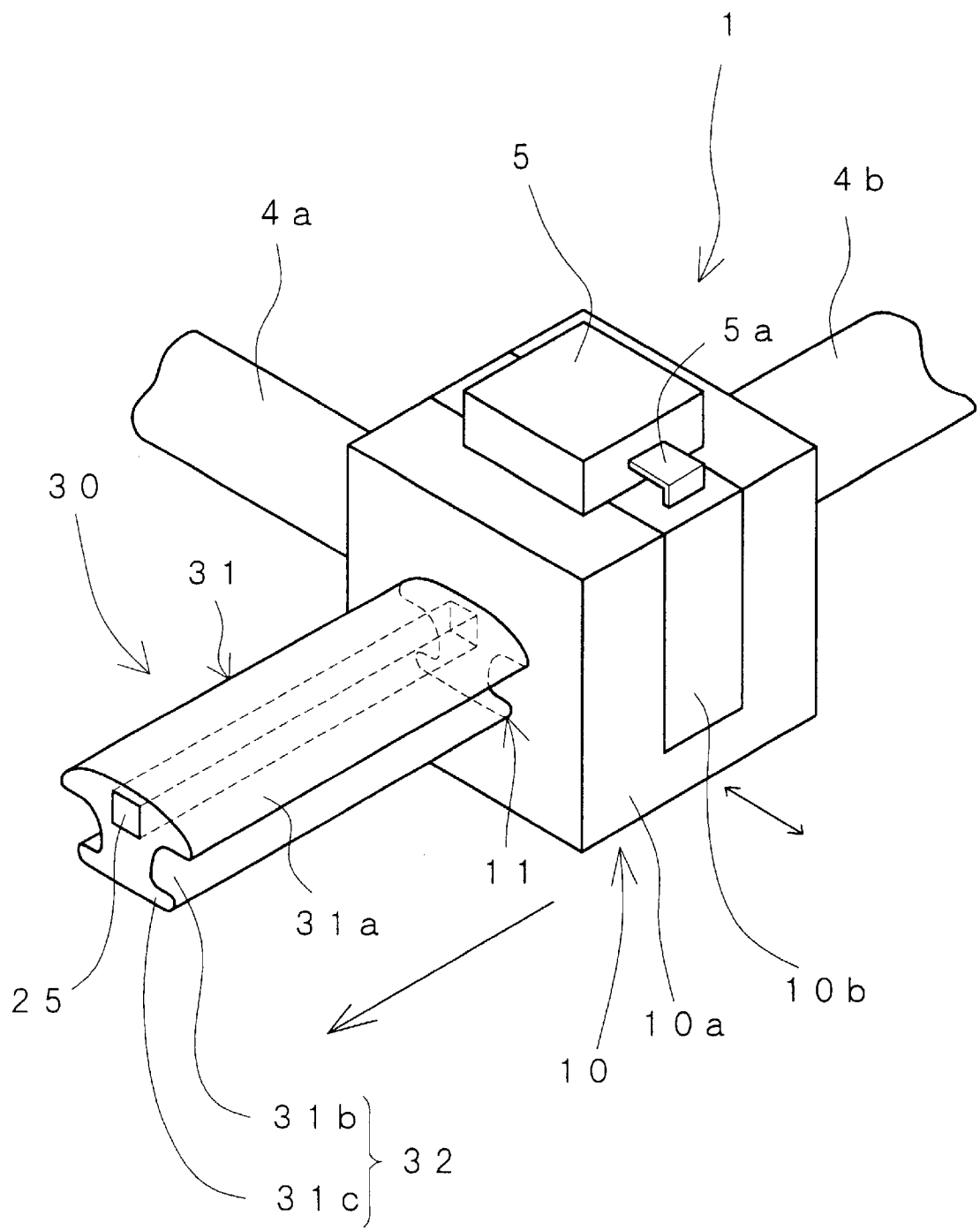
FIG. 2 is a perspective diagram that schematically shows the significant portions of the molding manufacturing device relating to an embodiment of the present invention.
Figure 3:
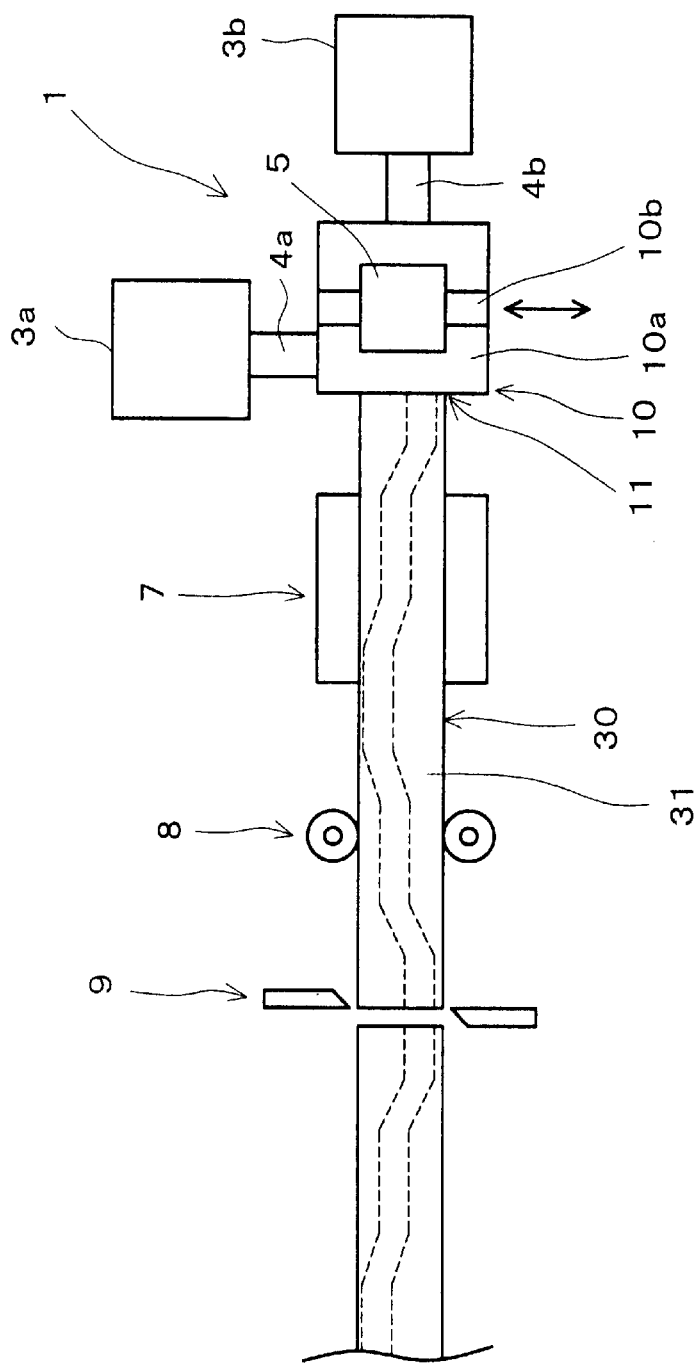
FIG. 3 is a diagram that schematically explains a molding manufacturing system equipped with a molding manufacturing device relating to an embodiment of the present invention.
Figure 4:
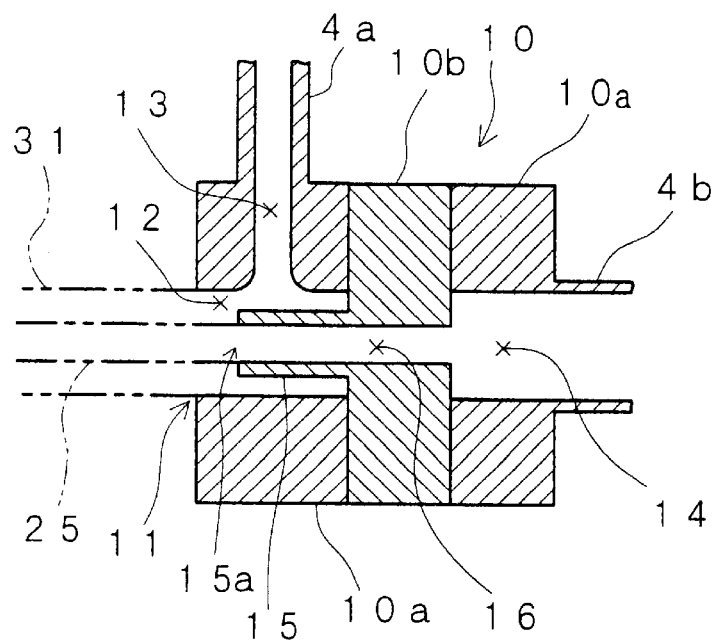
FIG. 4 is a cross-sectional view that schematically shows the significant portions of the molding manufacturing device relating to an embodiment of the present invention.
Figure 5:
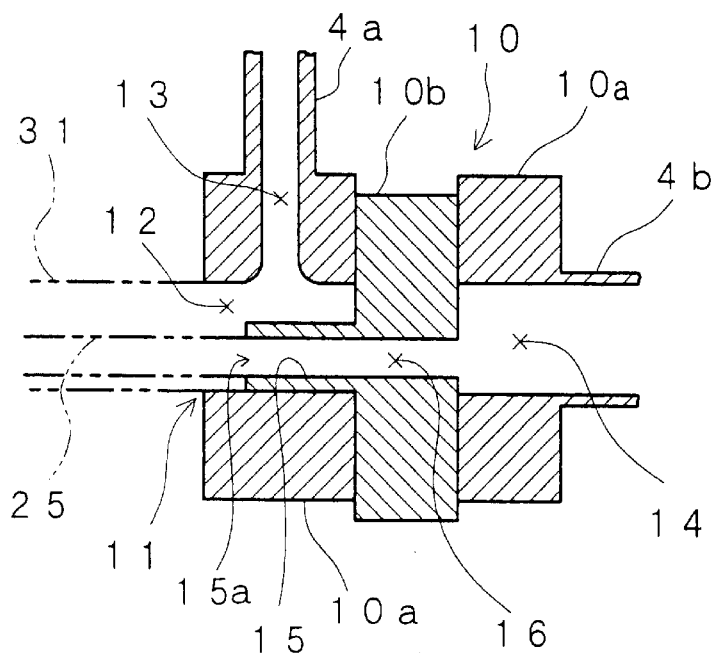
FIG. 5 is a cross-sectional view that schematically shows the significant portions of the molding manufacturing device relating to an embodiment of the present invention.
Figure 6:
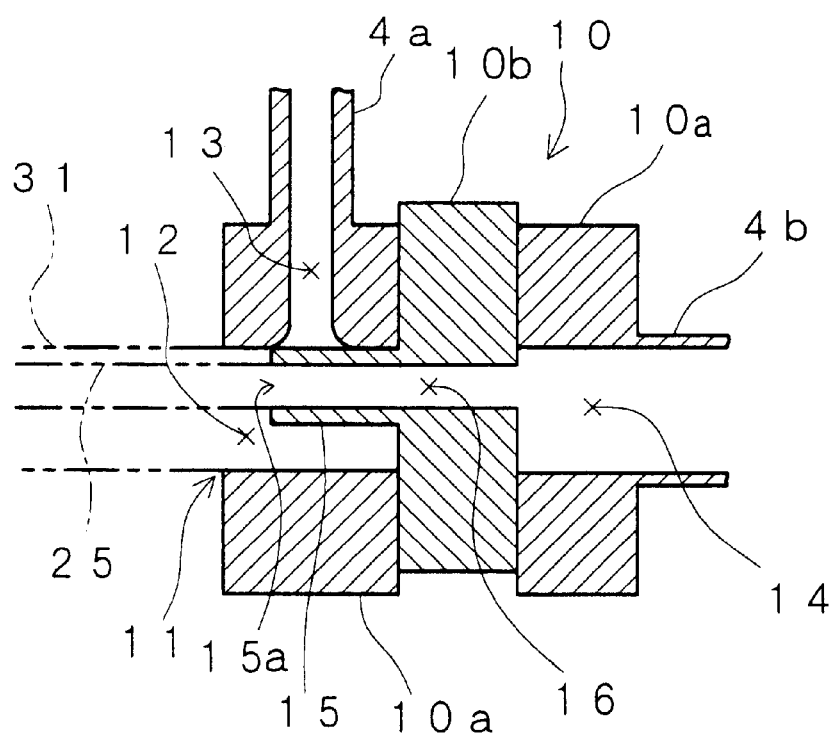
FIG. 6 is a cross-sectional view that schematically shows the significant portions of the molding manufacturing device relating to an embodiment of the present invention.

Next, several preferred embodiments of the first molding of the present invention will be explained with reference to the drawings. FIG. 1 is a block diagram that schematically shows the main configuration of manufacturing device 1 relating to the present embodiment. FIG. 2 is a perspective diagram that schematically shows the significant portions of this manufacturing device 1. FIG. 3 is a diagram that shows an overview of the molding manufacturing system that includes manufacturing device 1 relating to the present embodiment. FIGS. 4 through 6 are cross-sectional views that schematically show the internal structure of this manufacturing device 1.

Manufacturing device 1 relating to the present embodiment is a manufacturing device (i.e., extrusion molding machine) for processing/manufacturing, by means of extrusion molding, a vehicle molding that consists of a synthetic resin material corresponding to the body molding material (a plastic molded member molding material, such as a polyvinyl chloride resin and any of various types of thermoplastic elastomers, in this case) and a synthetic resin material corresponding to the insertion material (ABS resin, PP resin, and thermoplastic elastomer, etc.). As shown in FIGS. 1 and 2, the major configuration elements of manufacturing device 1 are, generally speaking, an extrusion mold (die) 10, a first extruder 3a (typically a screw-type extruder) that is equivalent to the body molding material supply area for supplying the body molding material (synthetic resin material) comprising the molding body to said mold 10, and a supply tube 4a; a second extruder 3b (typically a screw-type extruder) that is equivalent to the insertion material supply area for supplying the insertion material (synthetic resin material) comprising the insertion member to said mold 10, and a supply tube 4b; a drive part (drive device) 5 installed in said mold 10; and a controller 2 that controls items such as the supply statuses of the body molding material and the insertion material to mold 10.

The controller 2 basically comprises storage devices, such as ROM and RAM, and an input/output interface, etc. with a CPU (processor) in the center, and is electrically connected to both extruders 3a and 3b and drive part 5. Note that the controller 2 also can be connected to said mold 10 itself if an instrument (e.g., a cutting instrument, such as a cutter, that is movably installed in order to cut a portion of the decorative area), etc. for processing the molding body that has just been extruded from the extrusion port 11 will be installed in extrusion mold 10.

The CPU controls the overall operation of the manufacturing device according to a predetermined control program stored in the storage device. Note that the configuration of such controller 2 and its connection to other devices itself can be achieved by means of the known art in the applicable field and do not characterize the present invention; therefore, a detailed explanation is omitted. In the present invention, the manufacturing device 1 is not required to be entirely controlled by a particular program, and may have a circuit configuration in which the operations of all configuration elements are manually performed.

As shown in FIGS. 2 and 3, the two supply tubes 4a and 4b are respectively connected to two adjacent walls of extrusion mold 10. Moreover, the body molding material and the insertion material are respectively supplied to the mold via these two supply tubes 4a and 4b. That is, the body molding material is supplied via the first supply tube 4a connected to the first extruder 3a and the insertion material is supplied via supply tube 4b connected to the second extruder 3b.

Figure 45:
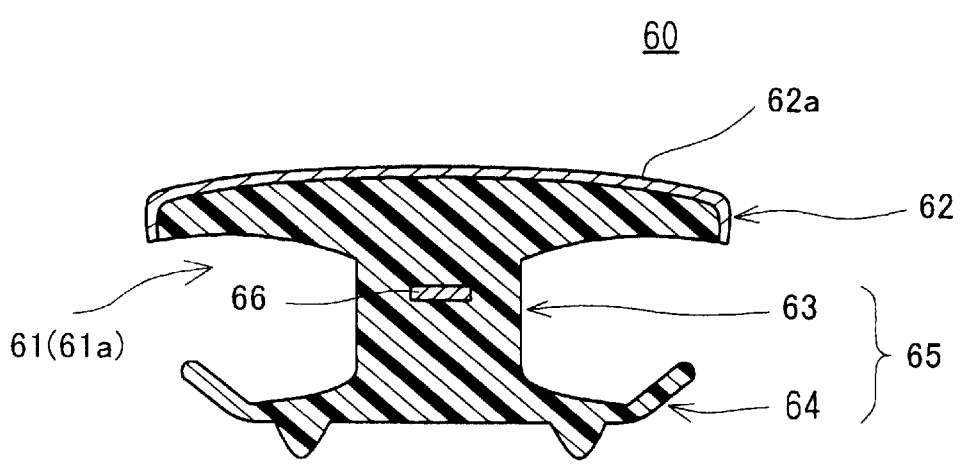
FIG. 45 is a cross-sectional view that schematically shows the cross section of a conventional and ordinary roof molding for a vehicle.
Figure 46:
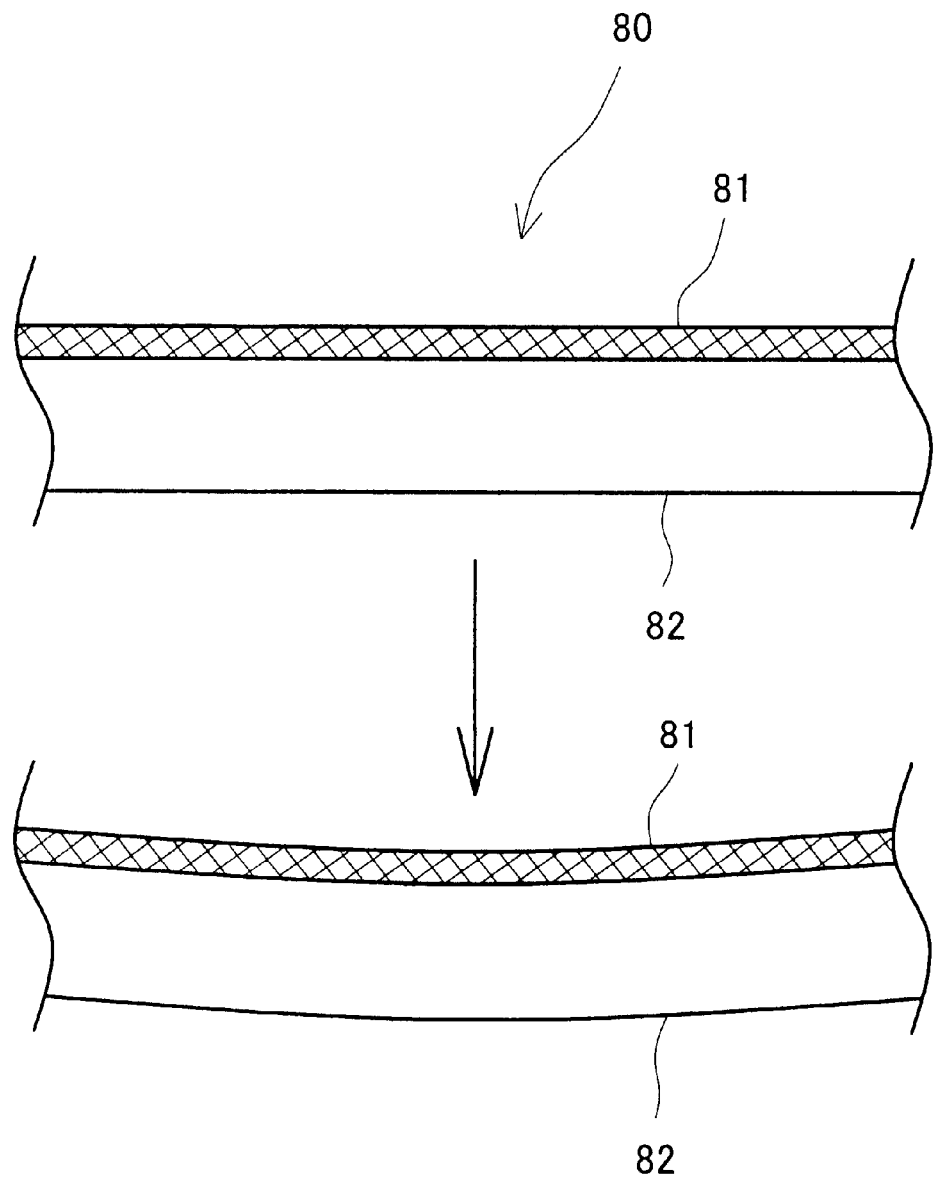
FIG. 46 is a diagram that schematically explains the curve that is generated based upon differences in mold shrinkage rates.

Furthermore, as shown in FIGS. 2 and 3, an extrusion port 11 for extruding the molding material in the predetermined shape is formed on the wall that is opposite from the second supply tube 4b of extrusion mold 10. Note that the shape of extrusion port 11 in the present embodiment is a shape that forms roof molding 30 having a cross-sectional shape that is nearly the same as the cross-sectional shape of the roof molding 60 shown in FIG. 45. Moreover, as shown in FIG. 2, molding body 31 of such a roof molding 30 comprises a decorative area 31a, which corresponds to the head portion that is exposed to the surface of the vehicle, and a mounting area 32 that is used for mounting within the installation area (i.e., leg 31b is press-fitted into the installation area and a securing area 31c is pressed against the vehicle body side within the installation area).

Next, the internal structure of the extrusion mold 10 itself relating to the present embodiment will be explained. As shown in FIG. 2 and FIG. 4 which is a central cross section of FIG. 2, the extrusion mold 10 relating to the present embodiment comprises a fixed area having the extrusion port 11 as well as the first and second supply tubes 4a and 4b, and a movable portion 10b that can slide in the transverse direction relative to extrusion port 11 and that is provided in the approximate center of said fixed area 10a. Further, the top of the external surface of extrusion mold 10 includes a drive part 5 that slidably moves the movable portion 10b. The drive part 5 and movable portion 10b of mold 10 are equivalent to the embedding position varying means in the present embodiment. A method of varying the embedding position of the insertion material (insertion member) using these elements will be described below.

Additionally, the extrusion mold relating to the present embodiment has a heater mechanism, a cooling mechanism, etc., similar to an ordinary extrusion mold, that allows the temperature inside the mold to be adjusted to a desired value based upon a control signal from the controller 2. Note that such mechanisms themselves do not particularly characterize the present invention; therefore, their detailed explanations are omitted.

As shown in FIG. 4, which is a top view of the cross section that passes through the center of extrusion mold 10, two material channels are connected to first supply tube 4a and second supply tube 4b (hereafter referred to as "the first sub-channel 13" and "the second sub-channel 14") and are disposed inside fixed area 10a of this extrusion mold 10. Furthermore, a material channel is connected to extrusion port 11 (hereafter referred to as "the main channel 12") and is formed on the front part of fixed area 10a. Moreover, the first sub-channel 13 is directly connected to the main channel 12.

Further, as shown in FIG. 4, an intra-movable area channel 16 is connected to second sub-channel 14 and is formed inside movable portion 10b of this extrusion mold 10. Insertion material introduction area 15, which is equivalent to the tube wall of intra-movable area channel 16, protrudes into the side of the main channel 12 that faces the movable portion 10b. Moreover, the open end of this insertion material introduction area 15 is an insertion material introduction port 15a according to the present embodiment. Note that this insertion material introduction port 15a has a nearly square cross-sectional shape and is positioned at a location (approximately the center in FIG. 4) that faces the portion of extrusion port 11 that forms the decorative area 31a.

As a result of such a configuration, it is possible to continuously introduce an insertion material having a square cross section into main channel 12 and at the same time, to merge the insertion material with the body molding material in an embedded state inside said channel. That is, the insertion material supplied from second supply tube 4b into extrusion mold 10 (fixed area 10a) is continuously introduced into main channel 12 from square-shaped insertion material introduction port 15a via second sub-channel 14 and the intra-movable area channel 16, and merges with the body molding material. During this step, insertion material introduction port 15a is positioned at a location that faces the portion of extrusion port 11 that forms the decorative area 31a of the molding body (see FIG. 2); as a result, the insertion material, which has merged with the body molding material, is extruded from said extrusion port 11 together with the body molding material while being embedded therein, without any change, near the center of decorative area 31a of the molding body. As in the so-called conventional two-color molding, under the pressurized conditions that exist inside extrusion mold 10, the insertion material (synthetic material) that has merged from insertion material introduction port 15a onto main channel 12 does not naturally mix with the body molding material which has different characteristics, such as viscosity, inside said channel, and as a result, is extruded from extrusion port 11 while maintaining the cross-sectional shape that was present at the time of the merger (i.e., the shape of insertion material introduction port 15a) and while being surrounded by the body molding material (i.e., while being embedded in the body molding material). Moreover, both the body molding material and the insertion material harden in the extrusion process and/or in the process following extrusion, thus forming the plastic molded member comprising the molding body and the insertion member (resin molded member) that has a square cross section and that is embedded in said molded member.

As explained above, manufacturing device 1 can make the roof molding 30 for vehicles, which consists of the plastic molded member comprising molding body 31 and an insertion member that has a square cross section and that is embedded in said molded member in the longitudinal direction. As schematically shown in FIG. 3, molding body 31 is extruded from extrusion port 11 of manufacturing device 1 according to the present embodiment and is typically guided to a cutting device 9 via a cooling device 7 and an extraction device 8. The continuously extruded molding body 31 is cut to a predetermined length using the cutting device 9. Note that these devices 7, 8, and 9 may be controlled by the controller 2 in the same way as manufacturing device 1 relating to the present embodiment is controlled, or their operations may be individually and independently controlled separately from manufacturing device 1.

Next, movable portion 10b and drive part 5 will be explained, which are provided in extrusion mold 10 according to the present embodiment and which characterize the present invention.

As shown in FIG. 2, drive part 5 slidably moves the movable portion 10b and is provided on the top of the external surface of extrusion mold 10. That is, as schematically shown in this figure, the drive part 5 comprises a solenoid, which is not shown in the figure, another drive mechanism and a drive shaft 5a that is connected to the drive mechanism and that extrudes to the outside. As shown in FIG. 2, the protruding tip of this drive shaft 5a is connected to movable portion 10b. Consequently, by turning on/off the drive mechanism contained inside drive part 5 according to either manual operation by an operator or a preset operation program, the advancing/retreating movements (i.e., protruding movement toward the outside of drive part 5 and retreating movement toward the inside of drive part 5) of the drive shaft 5a can be reversibly performed.

Moreover, because said drive shaft 5a and movable portion 10b of the extrusion mold are connected, movable portion 10b and insertion material introduction port 15a can slide together with the advancing/retreating movements. A more detailed explanation is offered below with references to the drawings.

For example, if the drive shaft 5a protrudes toward the outside of drive part 5 (see the arrow in FIG. 2) when the movable portion 10b is positioned in the state shown in the aforementioned FIG. 4, the movable portion 10b slides in one of the transverse directions as viewed from extrusion port 11 as shown in FIG. 5 (the downward direction in the figure). At the same time, the insertion material introduction port 15a, which extends from the movable portion 10b and moves in the same direction, moves to the location that faces an area near one side of the portion of extrusion port 11 that forms the decorative area 31a (see FIG. 2).

Conversely, if the drive shaft 5a is retreated toward the inside of drive part 5 (see the arrow in FIG. 2) when the movable portion 10b is positioned in the state shown in the aforementioned FIG. 4, the movable portion 10b slides in the opposite transverse direction from the direction shown in FIG. 5, as viewed from extrusion port 11 that is shown in FIG. 6 (the upward direction in the figure). At the same time, the insertion material introduction port 15a moves in the same direction and moves to the location that faces an area near the other side of the portion of extrusion port 11 that forms the decorative area 31a (see FIG. 2).

By advancing/retreating the drive shaft 5a in this manner, the merging position of the insertion material (resin molded member) that is guided into main channel 12 via the insertion material introduction port 15a, i.e., the embedding position inside the body molding material, can be moved by a predetermined distance.

Figure 7:
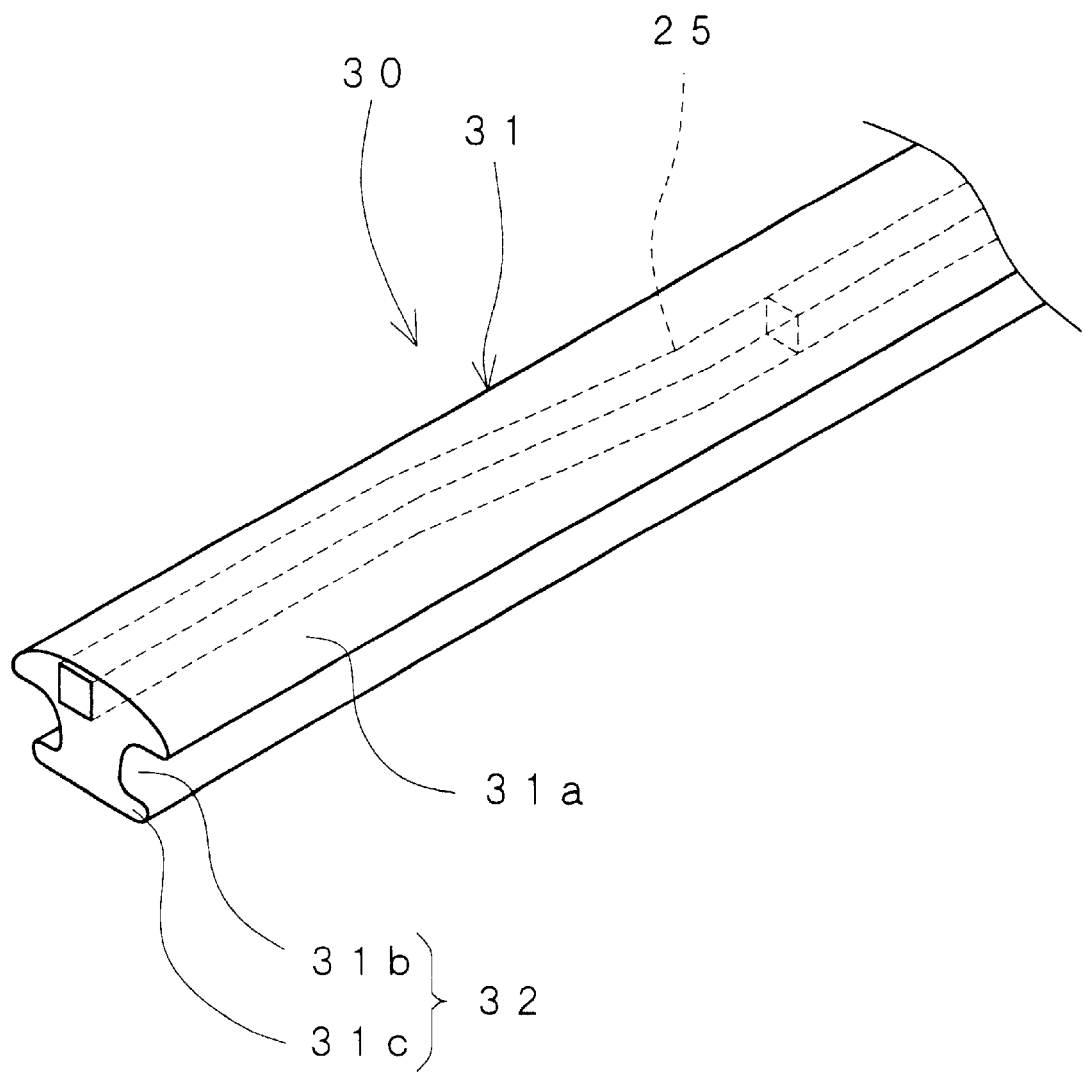
FIG. 7 is a perspective diagram that schematically shows a molding relating to an embodiment of the present invention.

As explained above, in manufacturing device 1 according to the present embodiment, the location at which the insertion material introduction port 15a faces extrusion port 11 can be varied by operating the drive part 5. Therefore, according to the manufacturing device 1 of the present embodiment, by varying as desired the embedding position of insertion member 25 inside molding body 31 for each portion along the longitudinal direction as shown in FIG. 7, molding 30 can be manufactured in which the bending direction of the molding itself differs at said each portion so that curves or bends having different curvatures are formed according to the offset of insertion member 25. Naturally, manufacturing device 1 can also extrude and mold elongated moldings having various cross-sectional shapes by changing the shape of extrusion port 11 and the channel inside the extrusion mold 10.

Next, an example of a manufacturing method (procedure) using the manufacturing device 1 will be explained. In this embodiment, a case will be explained in which a synthetic resin material, such as a polyvinyl chloride resin that has a relatively low mold shrinkage rate, is used as the body molding material and a synthetic resin material, such as an ABS resin, having a relatively high mold shrinkage rate is used as the insertion material.

In this embodiment, the manufacturing procedure will be explained for roof molding 30, which has the form shown in FIG. 7 and which will be installed in the side grooves 52a (FIG. 42) formed in the roof area 52 of vehicle 50.

In the present manufacturing method, the contour of the vehicle roof surface is known in advance and the embedding position of the insertion member is varied to correspond to said contour.

In FIG. 3, the body molding material consists of a relatively soft resin (polyvinyl chloride resin, etc.) and is continuously supplied from a first extruder 3a to the first sub-channel 13 via the first supply tube 4a. At the same time, an insertion material (ABS resin, etc.), which can form an insertion member that is harder than said body molding material, is continuously supplied from a second extruder 3b to the second sub-channel 14 via the second supply tube 4b. Furthermore, in this supply process, the insertion material is introduced into main channel 12 from the second sub-channel 14 via the intra-movable area channel 16 and from insertion material introduction port 15a while retaining the cross-sectional shape corresponding to said insertion material introduction port 15a.

Next, the body molding material is extruded from extrusion port 11 and the insertion material (insertion member) is embedded in decorative area 31a of molding body 31. During this process, the embedding position of insertion member 25 is varied as needed by moving movable portion 10b (insertion material introduction port 15a) based upon the operation of the drive part 5, as explained above, such that the location of said insertion member 25 within the cross section of molding body 31 varies along the longitudinal direction of molding body 31.

Figure 8:
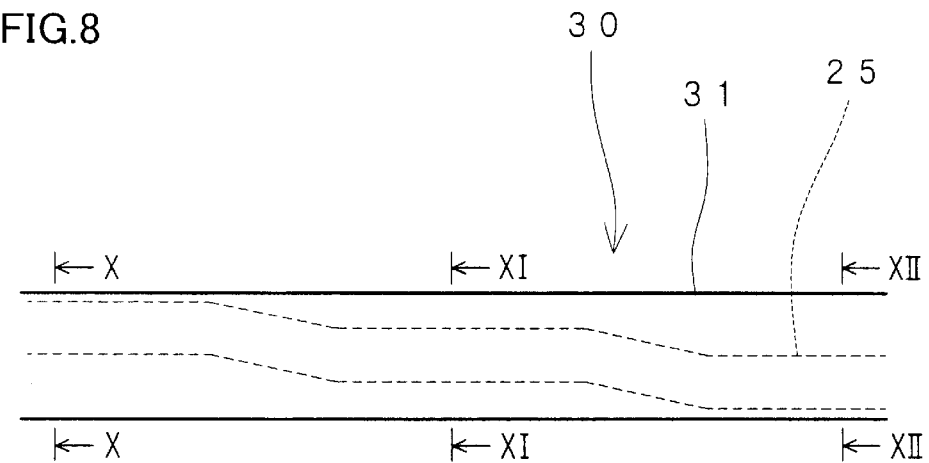
FIG. 8 is the top view that schematically shows the molding relating to an embodiment of the present invention.
Figure 10:
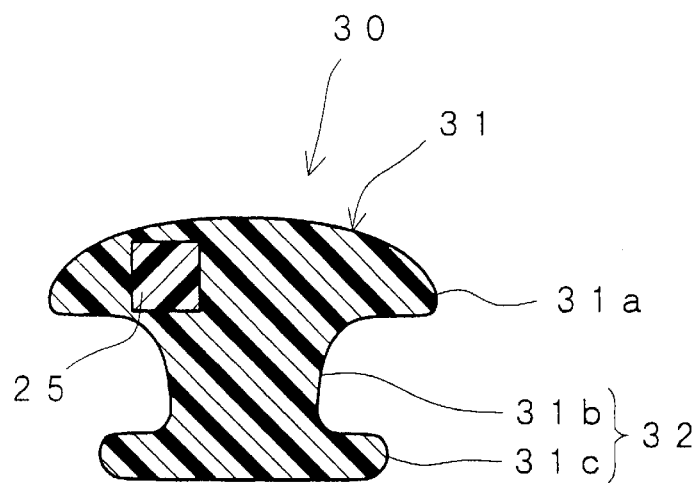
FIG. 10 is a cross-sectional view along the line X—X in FIG. 8.
Figure 11:
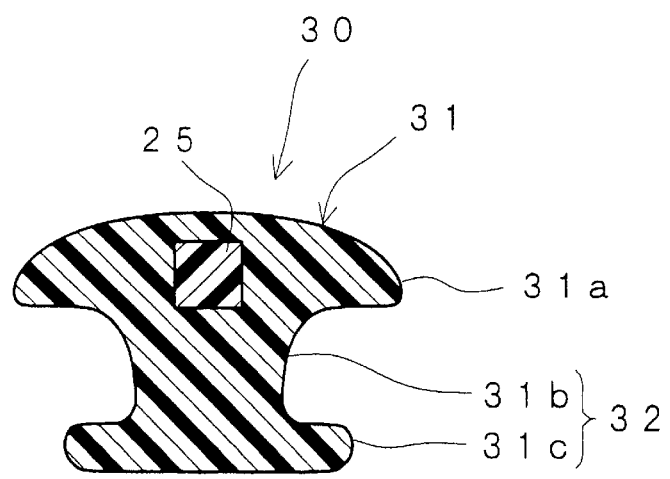
FIG. 11 is a cross-sectional view along the line XI—XI in FIG. 8.
Figure 12:
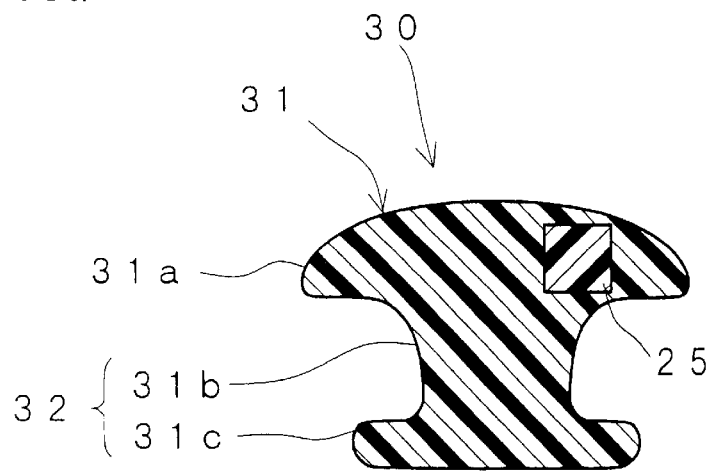
FIG. 12 is a cross-sectional view along the line XII—XII in FIG. 8.

In the present embodiment, the embedding position is varied according to the known contour of the vehicle roof surface. That is, when the extrusion molding is performed based upon the execution of the individual processes, the movable portion 10b is positioned in the state shown in FIG. 6 at a predetermined timing. During this step, insertion member 25 is offset to the vicinity of one of the edges of decorative area 31a, as shown in FIG. 8 and FIG. 10, which is a cross sectional view along the line X—X in FIG. 8. Subsequently, when a predetermined timing has been reached, movable portion 10b is gradually moved to the state shown in FIG. 4. During this process, the embedding position of insertion member 25 also changes together with the movement of movable portion 10b (see FIG. 8), and insertion member 25 is positioned near the center of decorative area 31a as shown in FIG. 11, which is a cross-sectional view along the line. XI—XI in FIG. 8. Furthermore, when a predetermined timing has been reached, movable portion 10b is gradually moved to the state shown in FIG. 5. During this process, the embedding position of insertion member 25 also changes together with the movement of movable portion 10b (see FIG. 8), and insertion member 25 is offset to the vicinity of the other edge of decorative area 31a (i.e., the position opposite from that shown in FIG. 10) as shown in FIG. 12, which is a cross-sectional view along the line XII—XII in FIG. 8.

As explained above, by appropriately operating the drive part 5 and thus moving movable portion 10b, the embedding position of insertion member 25, which is embedded within molding body 31, can be varied along the longitudinal direction.

Figure 9:
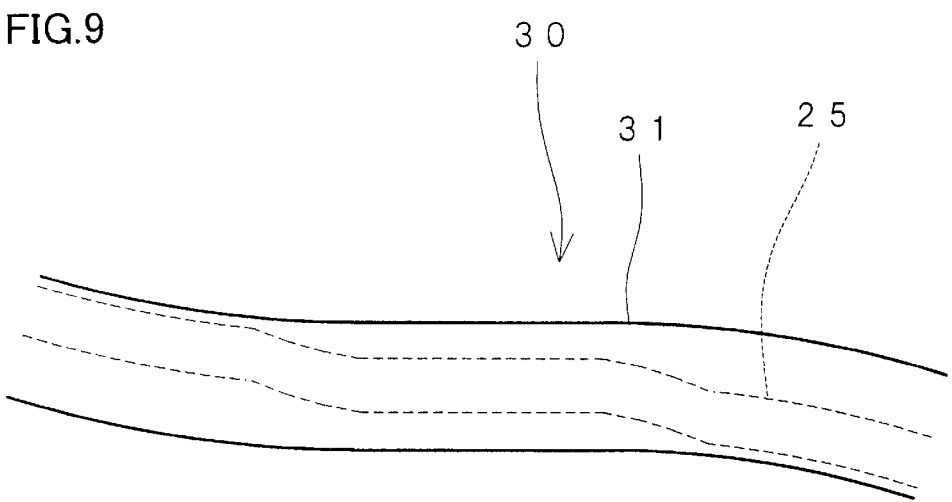
FIG. 9 is the top view that schematically shows the molding relating to an embodiment of the present invention.

Moreover, although molding 30 obtained by means of the manufacturing method can maintain a linear shape in the longitudinal direction immediately after molding (i.e., immediately after extrusion) as shown in FIGS. 7 and 8, it can be easily curved or bent due to molded member shrinkage that occurs after molding (typically, through cooling after extrusion molding) in the direction in which insertion member 25 is offset and at the curvature corresponding to the degree of the offset as shown in FIG. 9. That is, in the present embodiment, because a resin material having a larger mold shrinkage rate than the body molding material is used as the insertion material as explained above, the shrinkage of insertion member 25 after molding is greater than the shrinkage of molding body 31. Consequently, during a cooling or heating process after molding, the side to which insertion member 25 is offset shrinks more easily, whereas the side on which the insertion member 25 is not present does not shrink easily. Accordingly, molding 30 can be easily curved or bent according to the degree of such imbalance in shrinkage rates and in the direction to which insertion member 25 is offset (see FIG. 9). Therefore, in the first roof molding 30 of the present invention that is obtained by means of this manufacturing method, a bending process that accurately conforms to the contour in the installation area can be easily achieved.

Preferred examples of manufacturing device 1 that can preferably manufacture the first molding of the present invention and the first molding manufacturing method of the present invention, which utilizes said manufacturing device 1, were explained above. However, the present invention is not restricted to the aforementioned embodiments. For example, the extrusion mold 40 shown in the cross-sectional view in FIG. 13 may be used in place of the extrusion mold 10. This is further described below.

Figure 13:
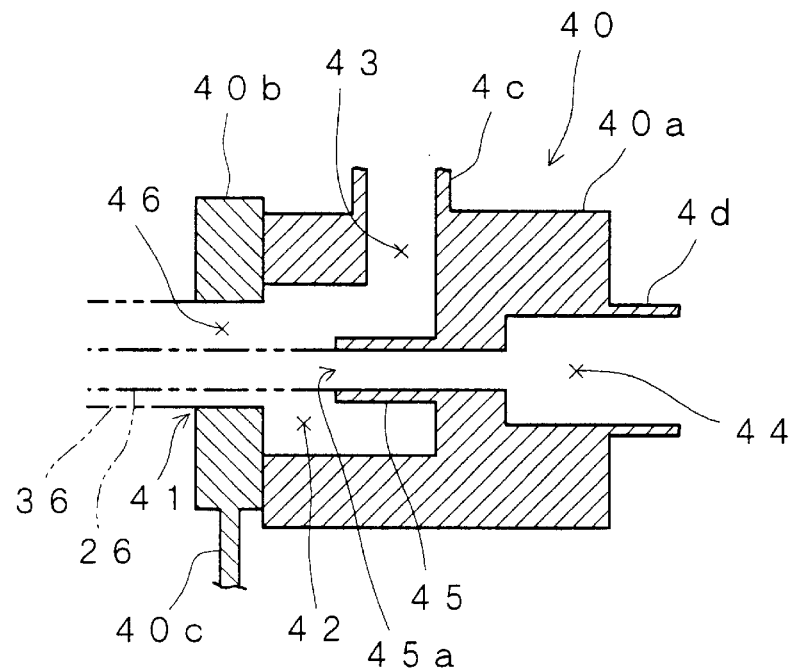
FIG. 13 is a cross-sectional view that schematically shows the significant portions of the molding manufacturing device relating to an embodiment of the present invention.

As shown in FIG. 13, an extrusion mold 40 relating to the present embodiment is comprised of a fixed area 40a to which a first supply tube 4c and a second supply tube 4d are connected in the same way as in the aforementioned embodiment, and a movable area 40b installed in close contact with the front portion (in the extrusion direction) of said fixed area 40a. Moreover, extrusion port 41 is formed in movable area 40b of the extrusion mold 40 relating to the present embodiment. Note that the shape of such an extrusion port 41 is the same as the shape of the extrusion mold 10. Furthermore, the extrusion mold relating to the present embodiment is provided with a heater mechanism, a cooling mechanism, etc. in the same way as in an ordinary extrusion mold. However, because these mechanisms do not particularly characterize the present invention, their detailed explanations are omitted.

Moreover, the body molding material and the insertion material are supplied into the mold via the two respective supply tubes 4c and 4d. That is, the body molding material is supplied into the mold via first supply tube 4c, which is connected to the first extruder 3a, and the insertion material is supplied into the mold via second supply tube 4d, which is connected to the second extruder 3b.

On the other hand, as shown in FIG. 13, a first sub-channel 43 and a second sub-channel 44, which are respectively connected to first supply tube 4c and second supply tube 4d, are formed inside said extrusion mold 40. Furthermore, a main channel 42, which is connected to an intra-movable area channel 46 formed inside movable area 40b, is formed on the front portion of fixed area 40a. Moreover, first sub-channel 43 is directly connected to main channel 42. On the other hand, as shown in FIG. 13, a connector tube 45 is installed between second sub-channel 44 and main channel 42. The portion of this connector tube 45 that is located on the side of main channel 42 is installed such that it protrudes into main channel 42, and its open end is the insertion material introduction port 45a according to the present embodiment. Note that, as in the aforementioned embodiment, this insertion material introduction port 45a is formed to have a nearly square cross-sectional shape and is positioned at a location that faces extrusion port 41 formed on movable area 40b. As a result, as in the aforementioned embodiment, an insertion material having a square cross-sectional shape can be continuously introduced into main channel 42. Furthermore, the insertion material can be merged with the body molding material in an embedded state inside said channel. The body molding material and the insertion material can then be extruded from extrusion port 41 to the outside of the mold via intra-movable area channel 46 while maintaining the embedded state.

By the way, movable area 40b of extrusion mold 40 according to the present embodiment is installed such that it can slide in the left-right and up-down directions relative to fixed area 40a. An engagement shaft 40c is provided on the exterior surface of this movable area 40b and can be linked to an external drive mechanism (e.g., a drive device equipped with a drive shaft that can be moved in the left-right and up-down directions using a solenoid, a motor, etc. as the drive source), which is not shown in the figure. Because of such a configuration, in the manufacturing device (extrusion molding machine) equipped with extrusion mold 40 relating to the present embodiment, the external drive mechanism can be directly or indirectly linked to the engagement shaft 40c to slide movable area 40b in the left-right and up-down directions relative to fixed area 40a. Consequently, as in the aforementioned embodiment, the location at which insertion material introduction port 45a faces extrusion port 41 can be varied as desired.

Therefore, a manufacturing device (extrusion molding machine) that uses extrusion mold 40 having such a configuration can also preferably manufacture the first molding of the present invention, similar to the manufacturing device in the aforementioned embodiment.

An example of manufacturing vehicle roof molding 35 will be explained below. Note that, in this example, a case will be explained in which a synthetic resin material, such as a polyvinyl chloride resin that has a relatively low mold shrinkage rate is used as the body molding material, and a synthetic resin material, such as an ABS resin that has a relatively high mold shrinkage rate is used as the insertion material.

In the present manufacturing method as well, the contour of the vehicle roof surface is known in advance, and the embedding position of the insertion member is varied to correspond to said contour.

The body molding material is continuously supplied to first sub-channel 43 via first supply tube 4c. Meanwhile, an insertion material is continuously supplied to second sub-channel 44 via second supply tube 4d. Furthermore, in this supply process, the insertion material is introduced into main channel 12 from second sub-channel 44 via connector tube 45 and from insertion material introduction port 45a while retaining the cross-sectional shape (a square shape in this case) corresponding to said introduction port 45a.

Next, the body molding material (molding body 36) is extruded from extrusion port 41 through intra-movable area channel 46 with the insertion material (insertion member 26) embedded therein. During this process, as explained above, the embedding position of insertion member 26 is varied as needed by moving movable area 40b using an external drive mechanism linked to engagement shaft 40c, such that the location of said insertion member 26 within the cross section of molding body 36 varies along the longitudinal direction of molding body 36. That is, in the extrusion molding based upon the execution of the individual processes, movable area 40b slides in the left-right and up-down directions as needed at a predetermined timing while keeping the movable area 40b in close contact with fixed area 40a. As a result, the location at which insertion material introduction port 45a faces extrusion port 41 is changed, and the change in said facing location changes the embedding position of the insertion material.

Figure 16:
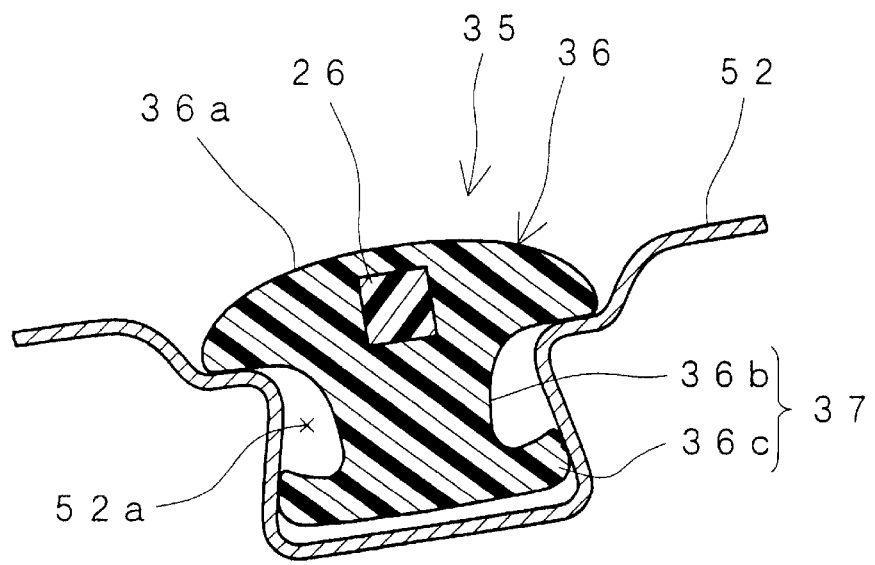
FIG. 16 is a cross-sectional view along the line XVI—XVI in FIG. 15.
Figure 17:
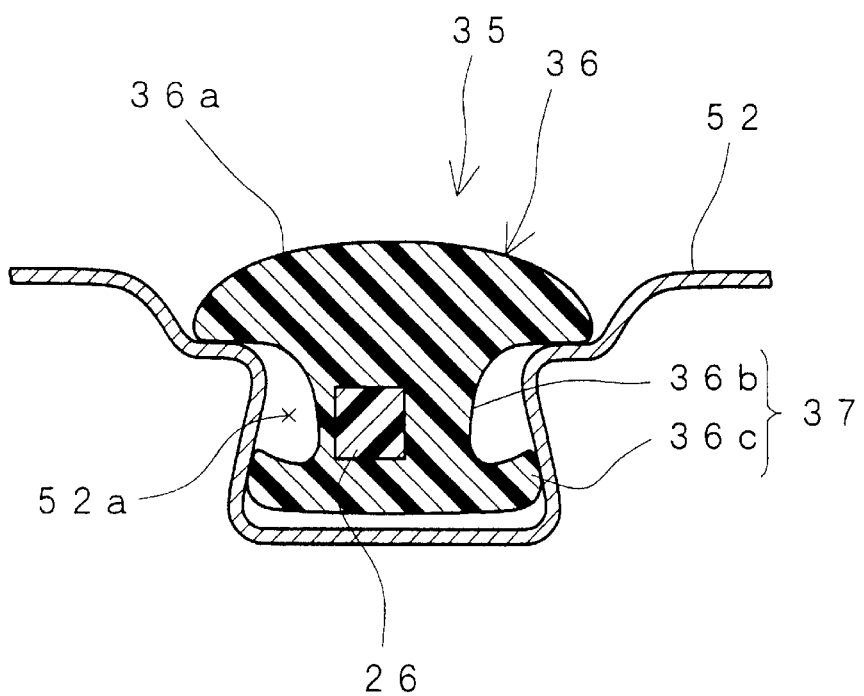
FIG. 17 is a cross-sectional view along the line XVII—XVII in FIG. 15.

By moving movable area 40b in this way, as shown in FIGS. 16 and 17, insertion member 26 can be embedded in decorative area 36a of molding body 36 in some portions along the longitudinal direction (FIG. 16) and insertion member 26 can be embedded in mounting area 37 (leg 36b or securing area 36c) of molding body 36 in other portions along the longitudinal direction (FIG. 17), as needed.

Figure 14:
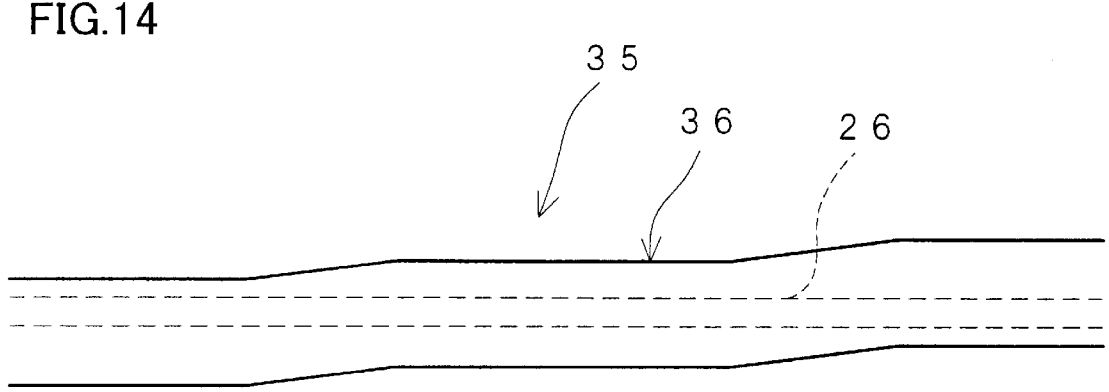
FIG. 14 is a top view that schematically shows a molding relating to an embodiment of the present invention.

Note that because extrusion port 41 itself moves when such an extrusion mold 40 is used, the shape of molding body 36 in molding 35 immediately following extrusion molding is not linear, but is curved in correspondence to the movement of extrusion port 41, as shown in FIG. 14. However, similar to the molding shown in FIG. 9 above, molding 35 can be obtained based upon molding shrinkage to provide curves having the desired directions and curvatures. As in the aforementioned embodiment (FIG. 9), because the shrinkage of insertion member 26 after molding is greater than the shrinkage of molding body 36, molding body 36 can be easily curved or bent at curvatures that correspond to the offset direction of insertion member 26 and to the degree of the offset. Therefore, also with the first roof molding 35 of the present invention obtained by means of a manufacturing method that uses such an extrusion mold 40, bends and twists that accurately conform to the contour of the installation area can be easily achieved.

As explained above, by appropriately moving movable area 40b, the embedding position of insertion member 26 that will be embedded in molding body 36 (i.e., the relative position of insertion member 26 within the cross section of molding body) can be varied along the longitudinal direction. Furthermore, in the first roof molding 35 obtained by means of the manufacturing method, the embedding position of insertion member 26 (i.e., the relative position of insertion member 26 within the cross section of molding body) can be varied for each portion along the longitudinal direction, including the decorative area 36a as well as mounting area 37 (leg 36b and securing area 36c). Therefore, in molding 35 obtained by means of said manufacturing method, curves or bends having the desired curvatures can be freely generated according to the offset in the embedding position of insertion member 26 in either transversal direction relative to the longitudinal direction.

Figure 15:
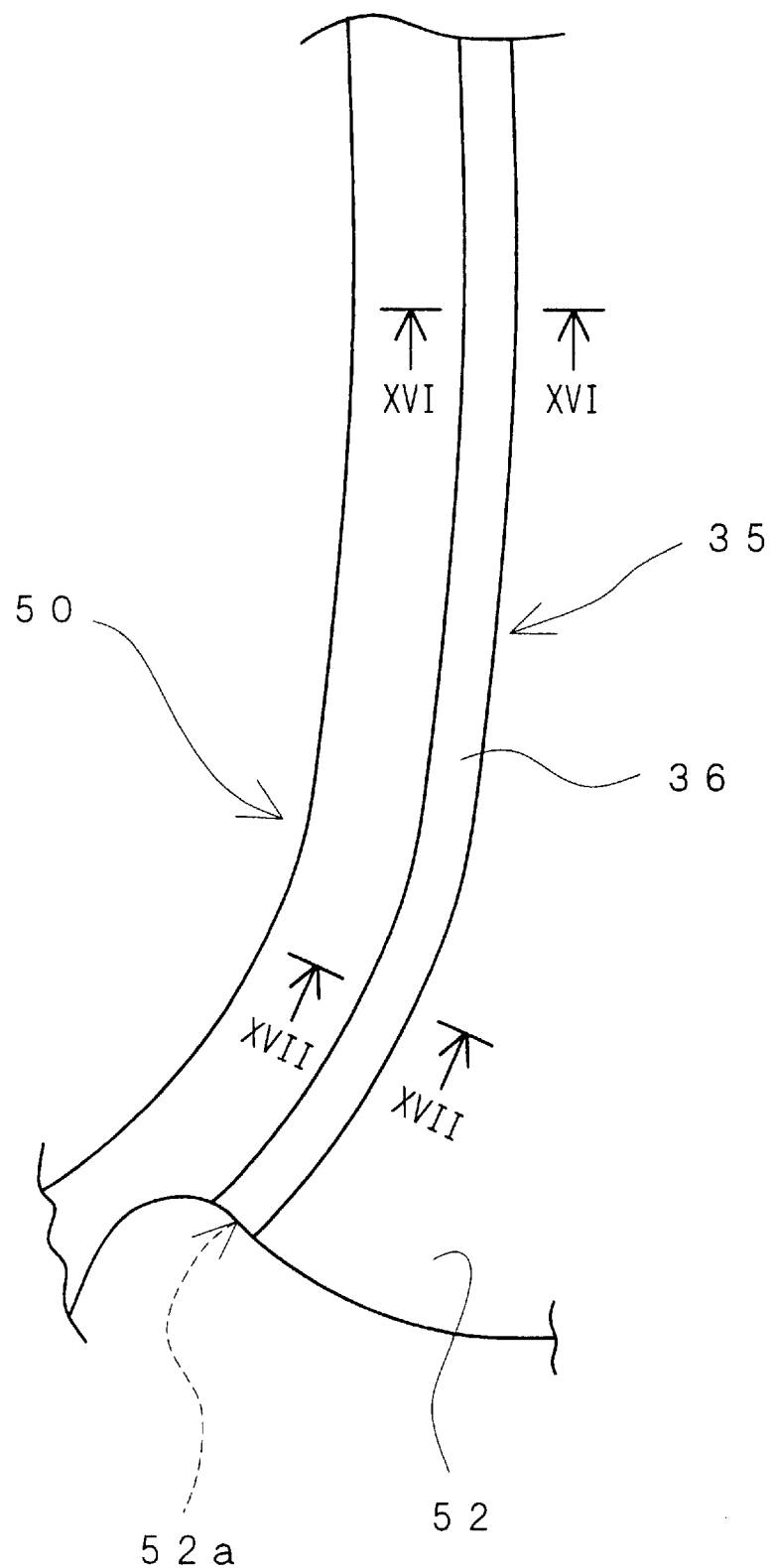
FIG. 15 is a diagram that schematically explains the state in which the roof molding relating to an embodiment of the present invention is installed in a roof-side groove.
Figure 42:
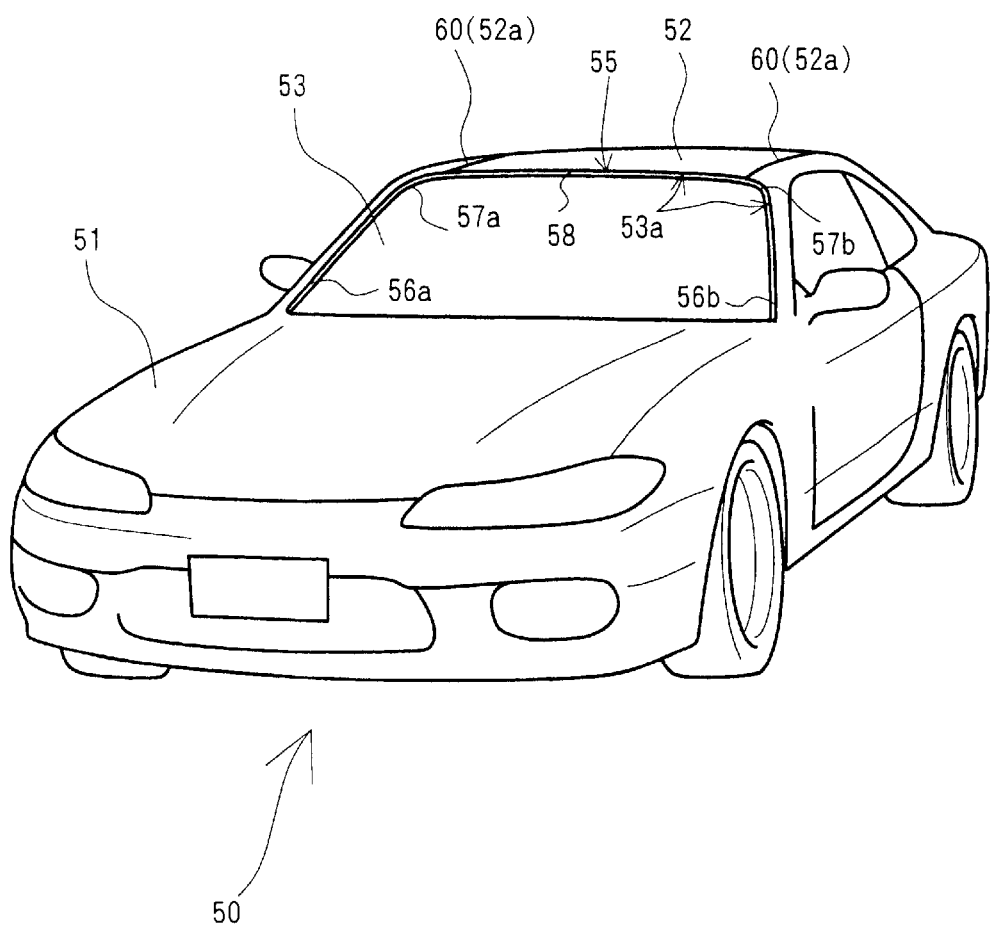
FIG. 42 is a perspective diagram that schematically shows the areas of a vehicle (automobile) into which the molding will be installed.
Figure 43:
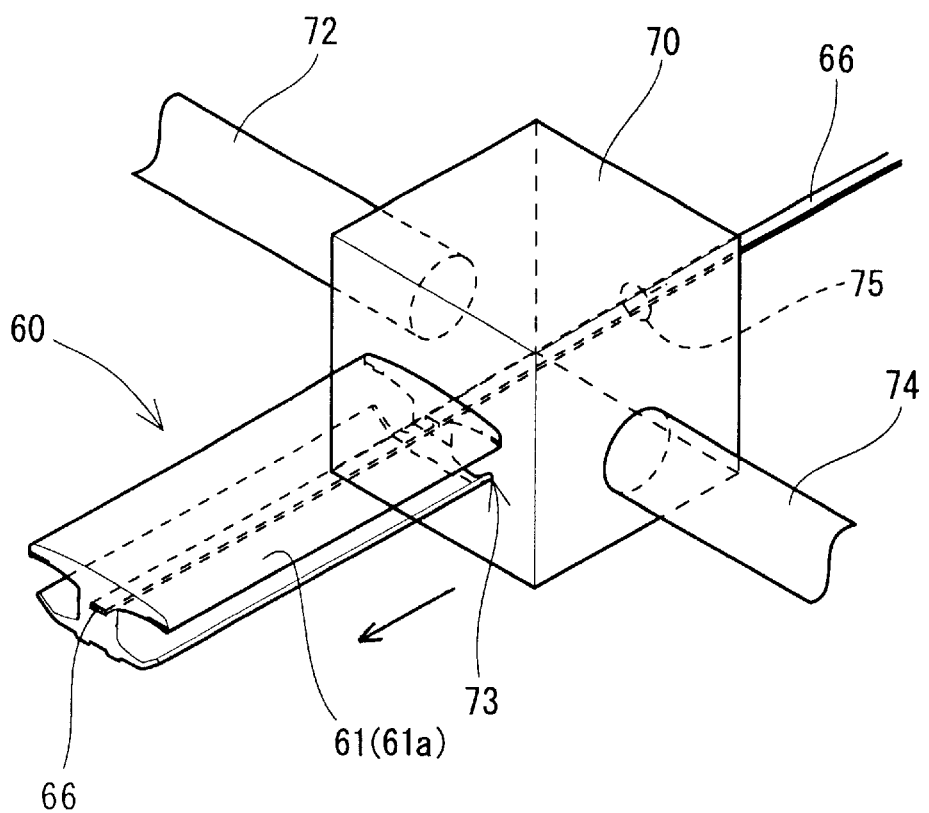
FIG. 43 is a perspective diagram that schematically shows the significant portions of a conventional and ordinary molding manufacturing device.
Figure 44:
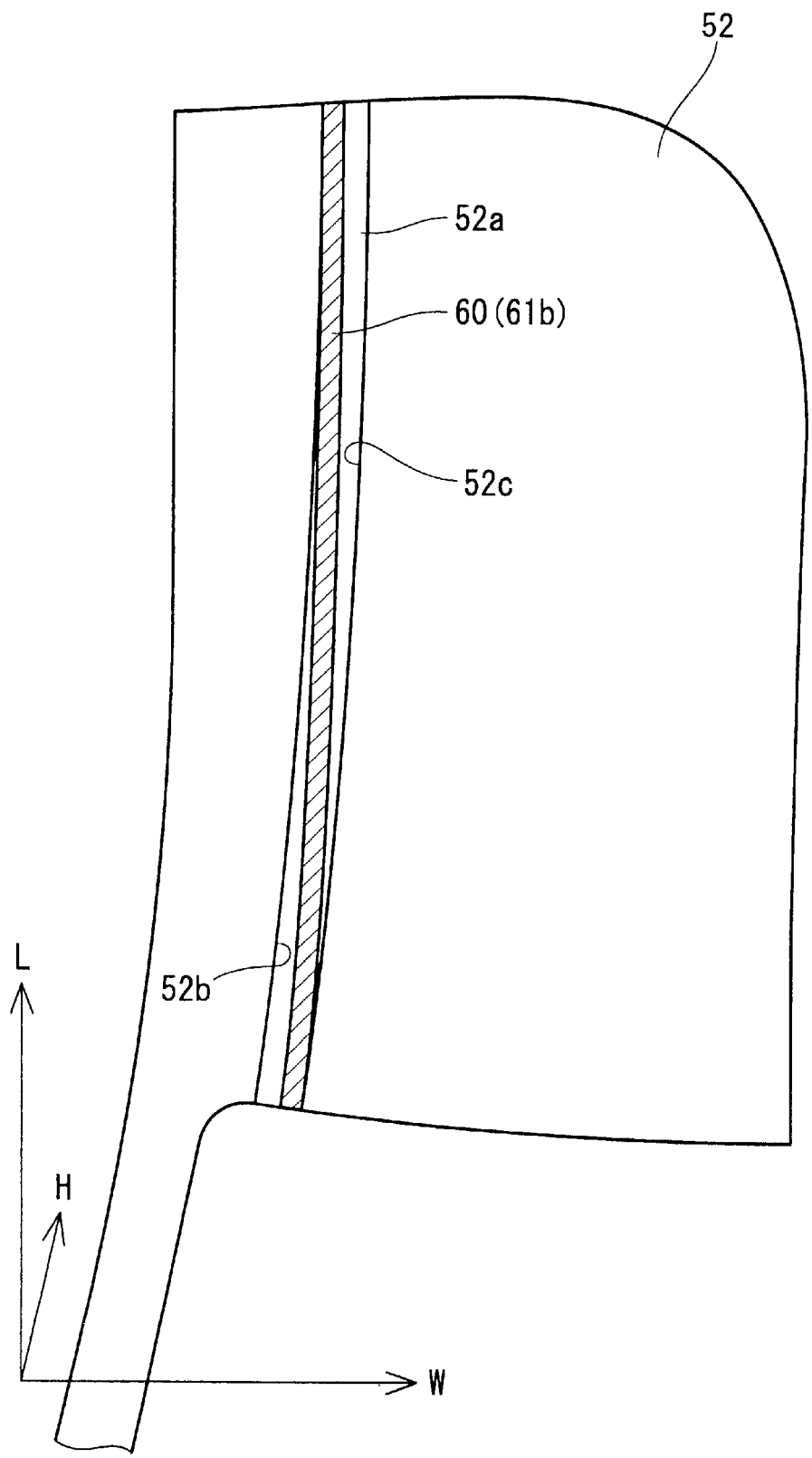
FIG. 44 is a diagram that schematically explains the state in which a conventional and ordinary roof molding is installed in a roof-side groove.

Consequently, the roof molding relating to the present embodiment can be mounted in roof-side grooves 52a such that it accurately conforms to the three-dimensional rounded state of the vehicle roof 52 shown in FIGS. 42 and 15. That is, as shown in FIG. 16 which is a cross-sectional view along the line XVI—XVI in FIG. 15, if the shape of roof-side groove 52a is relatively flat, molding body 36 can also be relatively linear, and thus the embedding position of insertion member 26 is set near the center of molding body 36 (typically in decorative area 36a). On the other hand, as shown in FIG. 17 which is a cross-sectional view along the line XVII—XVII in FIG. 15, if roof-side groove 52a has distinct bends, the embedding position of insertion member 26 is varied and offset (in the end area of mounting area 37 in the figure) to follow the contour of such a side groove 52a. In this way, the molding can be mounted appropriately in roof-side grooves 52a such that it accurately conforms to the complicated rounded state.

Although several preferred embodiments of the first molding of the present invention, as well as the manufacturing device and the manufacturing method thereof were explained above, the present invention is not limited to these embodiments.

Figure 18:
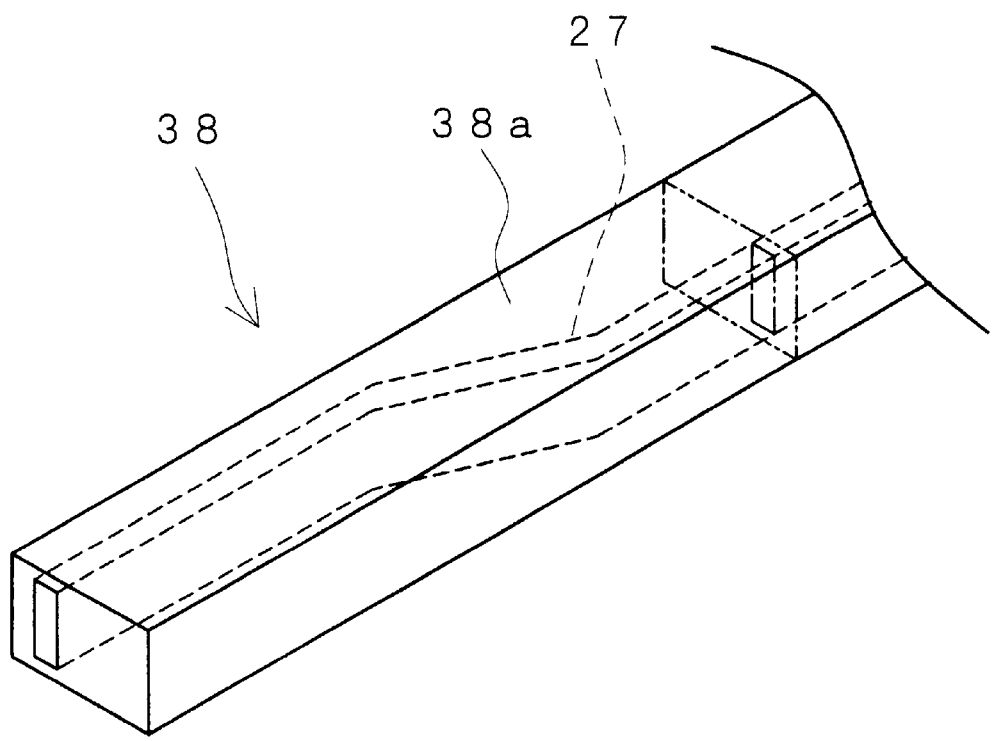
FIG. 18 is a perspective diagram that schematically shows a molding relating to an embodiment of the present invention.

For example, in all of the aforementioned embodiments, the insertion member that will be embedded in the molding body is formed by hardening various synthetic molding materials in a molten state after they have been merged with the body molding material inside an extrusion mold. However, the present invention is not limited to this technique. For example, a tape-shaped hard material (hard molded member) 27, which has been formed in advance from a synthetic resin such as high-density polyethylene and polypropylene, can be embedded as the insertion member in molding body 38a during extrusion molding as shown in FIG. 18. Although not limited to any particular method, such a molding 38 can be manufactured, for example, by introducing a tape-shaped insertion member 27 into main channel 12 together with a resin material or in place of the resin material from intra-movable area channel 16 (i.e., insertion material introduction port 15a) of the extrusion mold 10 shown in FIGS. 2 and 4. During this process, if the mold shrinkage rate of the plastic molded member comprising molding body 38a is greater than the shrinkage rate of tape-shaped insertion member 27, molding body 38a tends to curve in the transverse direction relative to the longitudinal direction and toward the direction in which said insertion member 27 is not present, in correspondence to the offset of tape-shaped insertion member 27, unlike in the aforementioned various embodiments. Note that if tape-shaped insertion member 27 is a drawn component, heat transfer from the body molding material may cause significant shrinkage.

Figure 19:
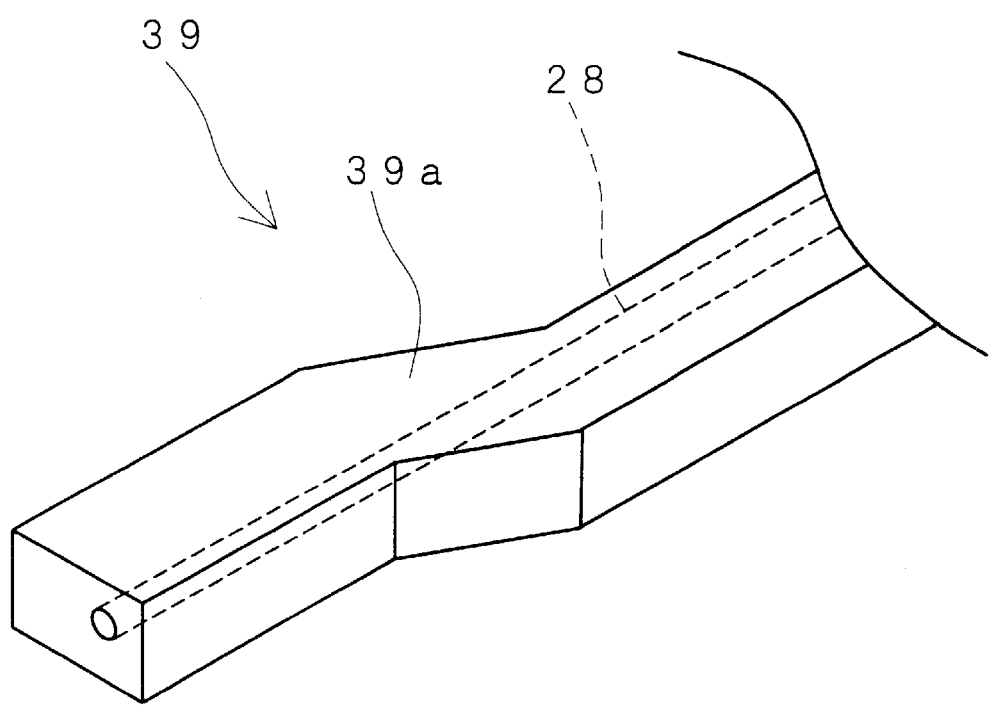
FIG. 19 is a perspective diagram that schematically shows the molding relating to an embodiment of the present invention.

Alternatively, a rod-shaped hard material (hard molded member) 28, which has been formed in advance from a synthetic resin such as high-density polyethylene and polypropylene, can be embedded as the insertion member in molding body 39a during extrusion molding as shown in FIG. 19. Although not limited to any particular method, such a molding 39 can be manufactured, for example, by introducing a rod-shaped insertion member 28 into main channel 42 together with a resin material or in place of the resin material from connector tube 45 (i.e., insertion material introduction port 45a) of the extrusion mold 40 shown in FIG. 13. Note that if the mold shrinkage rate of the plastic molded member comprising molding body 39a is greater than the shrinkage rate of rod-shaped insertion member 28, molding body 39a tends to curve in the transverse direction relative to the longitudinal direction and toward the direction in which said insertion member 28 is not present. An example of such a material includes FRTP that is made by mixing glass fibers into the insertion member. In this case, the mold shrinkage rate can be changed by mixing in glass fibers; therefore, the objective of the present invention can be achieved even if the body molding material and the insertion material (i.e., a material including an FRTP matrix) are made of the same thermoplastic resin.

Note that commercially-available, ready-made products can be purchased and supplied to extrusion molds 10 and 40 to form the insertion members 27 and 28. Alternatively, it is possible to provide/install an extruder/extrusion molding machine for separately forming the insertion member on the upstream side of the extrusion line (see FIG. 3), to form an insertion member having the desired shape, and to supply the formed insertion member together with the body molding material to the extrusion mold located downstream.

Furthermore, although only a single insertion member is embedded in the molding body in all of the aforementioned embodiments, the present invention is not limited to such a technique. Two or more insertion members (including conventional metal core materials) comprised of the same type or different types of materials can also be embedded. In particular, metal core materials having a circular wire shape can be easily bent, unlike core materials having non-circular cross sections such as plate shapes, and thus can be preferably adopted in order to ease the extraction operation in the extrusion process.

Moreover, the molding body is not limited in any way to being formed from a single kind of molding material as in the aforementioned embodiments. For example, the molding body may be formed from two or more kinds of resin molding materials (e.g., one kind of resin material for the decorative area and another kind of resin material for the mounting area) as in the so-called conventional two-color molding. In this case, by providing supply tubes and extruders for supplying such two or more kinds of molding materials, the present invention can be preferably implemented in the same manner as in the aforementioned embodiments.

Furthermore, the means for varying the embedding position is not limited to a means that varies the facing locations of the insertion material introduction port and the extrusion port, and may be a means based upon another mechanism as long as it can vary the embedding position of the insertion member (insertion material) such that the relative position of said insertion member (insertion material) within the cross section of the molding body varies along the longitudinal direction.

Figure 20:
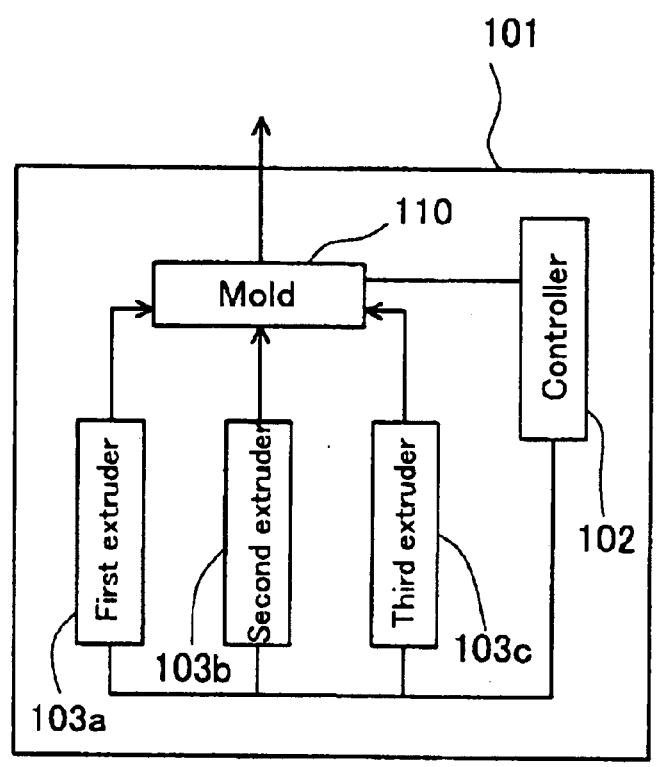
FIG. 20 is a block diagram that shows the configuration of a molding manufacturing device relating to an embodiment of the present invention.
Figure 21:
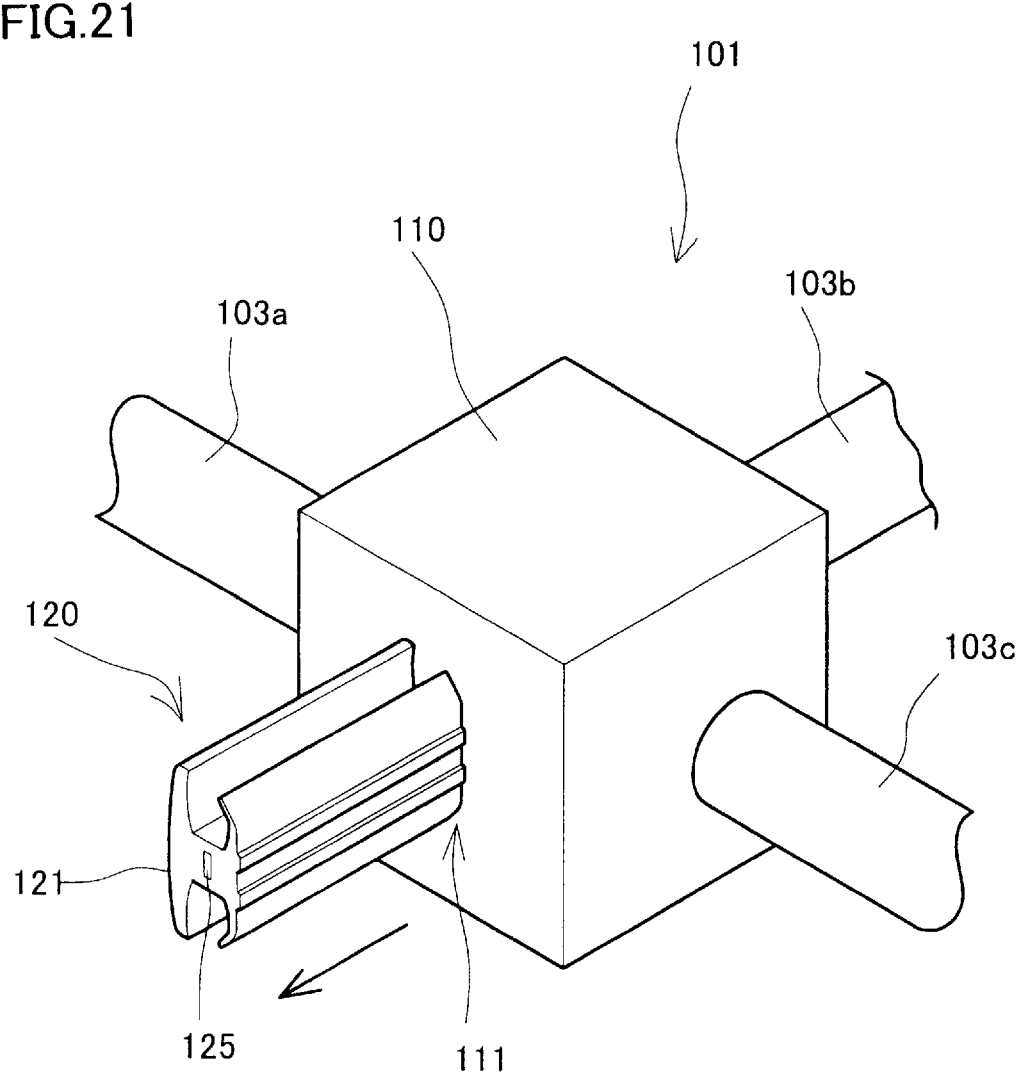
FIG. 21 is a perspective diagram that schematically shows the significant portions of the molding manufacturing device relating to an embodiment of the present invention.
Figure 22:
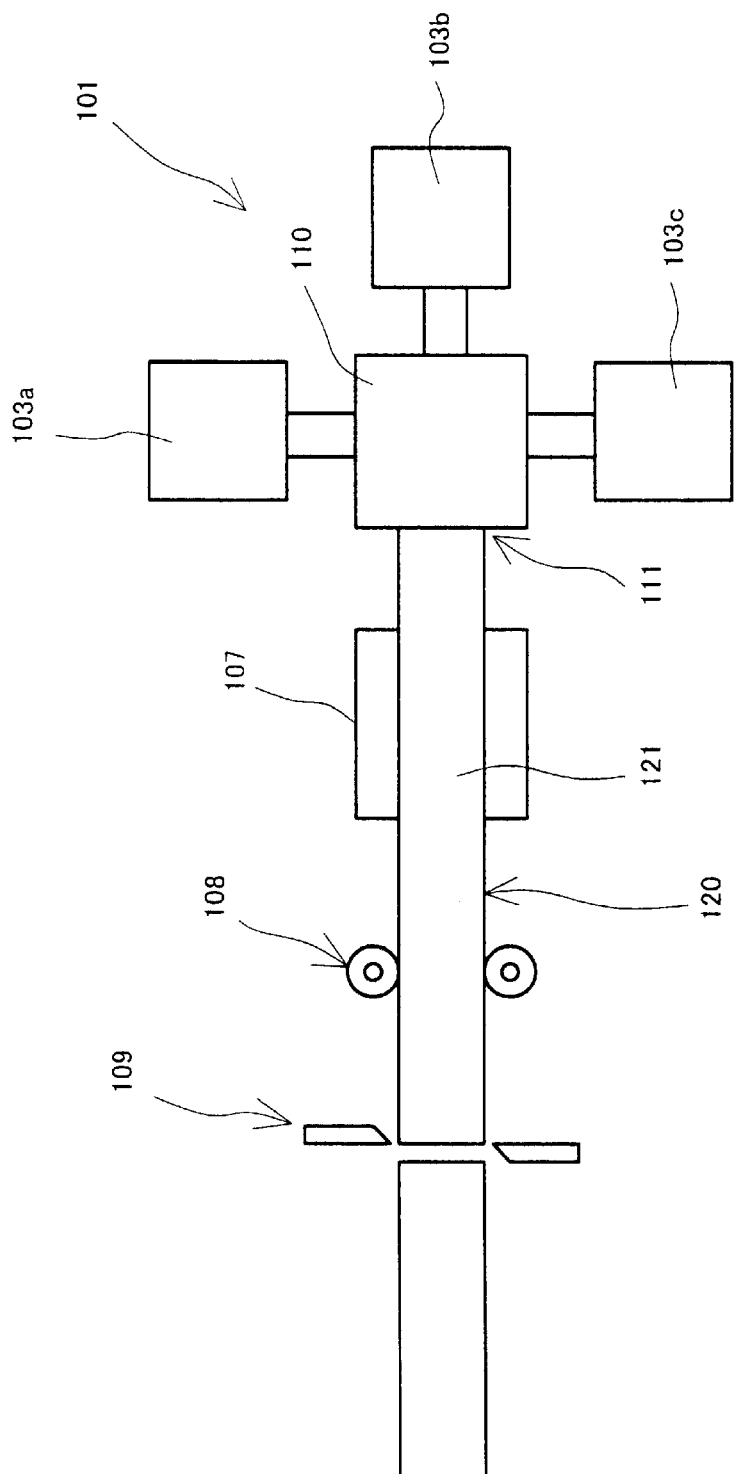
FIG. 22 is a diagram that schematically explains a molding manufacturing system equipped with the molding manufacturing device relating to an embodiment of the present invention.

Next, several preferred embodiments relating to the second and the third molding of the present invention will be explained with references to the drawings. FIG. 20 is a block diagram that shows the major configuration of manufacturing device 101 for manufacturing the second and the third molding 120 of the present invention using extrusion molding (hereafter referred to as "manufacturing device 101"). FIG. 21 is a perspective diagram that schematically shows the significant portions of manufacturing device 101. FIG. 22 is a diagram that schematically shows a molding manufacturing system containing manufacturing device 101.

Manufacturing device 101 is a device (i.e., extrusion molding machine) for processing/manufacturing vehicle molding comprised of two or more molding materials (three kinds) that form plastic molded members having mutually different mold shrinkage rates, by means of extrusion molding.

As shown in FIGS. 20 and 21, the significant elements of manufacturing device 101 are, generally speaking, an extrusion mold (die) 110, a total of three screw-type extruders 103a, 103b, and 103c (hereafter respectively referred to as "the first extruder 103a," "the second extruder 103b," and "the third extruder 103c,") which are equivalent to the body molding material supply area for supplying the molding materials (synthetic resin materials) comprising the molding body to said mold 110, and a controller 102 which controls items such as the flow rates (i.e., the supply volume per unit time) of the body molding material and the insertion material to extrusion mold 110.

Said controller 102 is basically comprised of storage devices such as ROM and RAM, and an input/output interface, etc. with a CPU (processor) in the center, and is electrically connected to the extruders 103a, 103b, and 103c. Note that if an instrument (e.g., a cutting instrument, such as a cutter, movably installed for cutting part of the decorative area), etc. for processing the molding body that has just been extruded from the extrusion port 111 is to be installed in extrusion mold 110, said controller 102 can also be connected to said mold 110 itself.

The CPU controls the overall operation of manufacturing device 101 according to a predetermined control program stored in the storage device. The present embodiment contains a program that can change according to a predetermined cycle, the flow rates (discharging rates) of individual molding materials to be supplied from individual extruders. This constitution will be described below.

Note that the configuration of such controller 102 and its connection to other devices can be achieved according to the known art in the applicable field and do not characterize the present invention, and therefore, a detailed explanation is omitted.

As shown in FIG. 21, an extrusion port 111 having a predetermined shape is formed on one wall of extrusion mold 110. Note that the shape of extrusion port 111 in the present embodiment is a shape that forms a roof molding 120 having a cross-sectional shape that is nearly the same as the shape of the roof molding 60 shown in FIG. 45. Moreover, the three screw-type extruders 103a, 103b, and 103c are connected to the three walls, respectively, excluding the wall having the extrusion port 111. In this way, different molding materials can be supplied into the mold from extruders 103a, 103b, and 103c.

Note that this extrusion mold 110 has a core supply port that is not shown in the figure; typically, a metal plate-shaped core material 125 is supplied into the mold via this core supply port. Moreover, the supplied core material 125 merges with the molding materials inside said extrusion mold 110 and is sequentially exhausted from extrusion port 111 while being embedded in molding body 121.

Additionally, extrusion mold 110 has a heater mechanism, a cooling mechanism, etc., which are not shown in the drawings, in the same way as in an ordinary extrusion mold, thereby allowing the temperature inside the mold to be adjusted to a desired value based upon a control signal from the controller 102. Note that such mechanisms themselves do not particularly characterize the present invention, and therefore, their detailed explanations are omitted.

Figure 23:
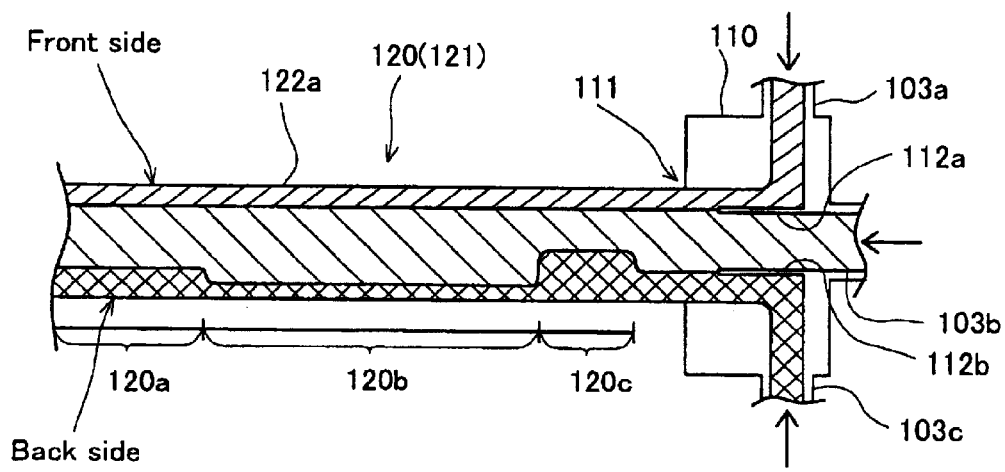
FIG. 23 is a cross-sectional view that schematically shows the internal structure of the molding relating to an embodiment of the present invention during extrusion molding.

Next, roof molding 120 that will be manufactured by manufacturing device 101 and a manufacturing method thereof will be explained. Note that FIG. 23 is a cross-sectional view that schematically shows the internal structure of molding 120 that is extrusion-molded by manufacturing device 101.

In the present embodiment, roof molding 120 is accurately curved to conform to the contour of the installation area of the vehicle roof (side grooves 52a shown in FIG. 42) and is manufactured by operating manufacturing device 101 according to a predetermined molding manufacturing program that is pre-stored in the ROM of controller 102. This operation is described in detail below.

Figure 26:
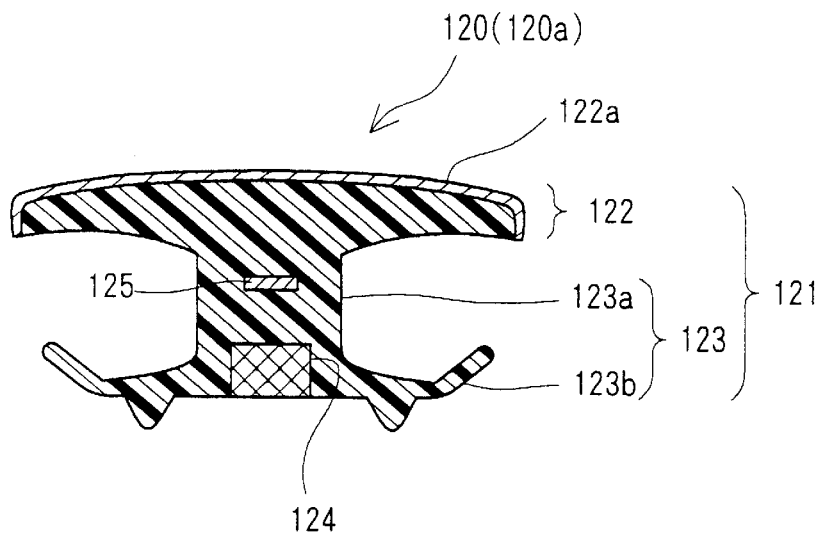
FIG. 26 is a cross-sectional view along the line XXVI—XXVI in FIG. 25.

FIG. 26 shows the cross-sectional shape of a part (a large-R curved area 120a described below) of roof molding 120 that is manufactured using manufacturing device 101. As shown in this figure, molding body 121 of roof molding 120 according to the present embodiment is comprised of a decorative area 122, which corresponds to the head that is exposed to the roof surface of the vehicle, and a mounting area 123 used for mounting in the installation area (i.e., leg 123a is press-fitted into the installation area and a securing area 123b is pressed against the vehicle body side at said installation area). Moreover, most of this molding body 121 is comprised of a resin molding material (hereafter referred to as "Material 2") supplied from the second extruder 103b. The present embodiment uses a TPO material, which is generally used for vehicle roof moldings.

Meanwhile, a design surface 122a consists of a resin material that is different from the Material 2 and is formed on the surface of decorative area 122. This resin material (hereafter referred to as "Material 1") is supplied from the first extruder 103a, and in the present embodiment, a TPO material that is harder than the Material 2 is used for Material 1 (i.e., a TPO material containing a relatively higher percentage of PP).

As shown in FIG. 26, high-shrinking resin area 124 consisting of a resin material (hereafter referred to as "Material 3") having a mold shrinkage rate that is the same or slightly larger than the Material 1 is formed in the approximate center of the bottom of mounting area 123. This Material 3 is supplied from the third extruder 103c, and in the present embodiment, a TPO material having nearly the same hardness as the Material 1 is used for Material 3 (i.e., a TPO material containing a relatively higher percentage of PP).

In molding 120 based upon such a configuration, by varying the area proportion of the high-shrinking resin area 124 within the cross section of molding body 121, curves having different curvatures in the up-down directions of the molding body can be formed along the longitudinal direction. The means for varying said area proportion will be explained below.

As shown in FIG. 23, partitions 112a and 112b are installed inside extrusion mold 110 of manufacturing device 101 in order to prevent the disorderly merger of the individual molding materials (Material 1, Material 2, and Material 3) supplied from the individual extruders 103a, 103b, and 103c. These partitions separate the channels for individual molding materials inside the mold to some degree, and as shown in FIG. 23, the individual molding materials flowing inside the mold merge together just before extrusion port 111 while being pushed in the same direction toward said extrusion port 111. Because extrusion mold 110 is configured in such a shape, by mutually adjusting the flow rates of the individual molding materials supplied from the individual extruders 103a, 103b, and 103c, i.e., supply volumes per unit time, the area proportions of the individual molding materials (i.e., plastic molded members to be formed from these materials) within the cross section of the molding body to be extruded from extrusion port 111 can be varied along the longitudinal direction.

For example, in the part indicated by symbol 120a in FIG. 23, Material 2 and Material 3 are being supplied at predetermined flow rates from second extruder 103b and third extruder 103c, respectively. At a predetermined timing, the flow rate of Material 3 is decreased and at the same time the flow rate of Material 2 is increased. Then, the merging state between Material 2 and Material 3 inside extrusion port 111 is changed, thereby increasing the area proportion of the part occupied by Material 2, and inversely proportional to this change, decreasing the part occupied by Material 3 (area proportion), as in the part indicated by symbol 120b in FIG. 23. Conversely, when the flow rate of Material 3 is increased at a predetermined timing and at the same time the flow rate of Material 2 is decreased, the part occupied by Material 3 (area proportion) increases, and inversely proportional to this change, the part occupied by Material 2 (area proportion) decreases, as in the part indicated by symbol 120c in FIG. 23.

As explained above, in the present embodiment, the area proportions of the individual molding materials within the cross section of the molding body can be easily adjusted by adjusting the flow rates from the individual extruders 103a, 103b, and 103c. Furthermore, extruders 103a, 103b, and 103c relating to the present embodiment are ordinary screw-type extruders as described above, and therefore, such flow rate adjustments can be simply achieved by adjusting the rotational speeds of the screws.

A manufacturing example of molding 120 relating to the present embodiment will be explained below with reference to FIG. 24. Note that FIG. 24 is a chart schematically showing the changes over time in the volumes of the individual molding materials supplied from the individual extruders 103a, 103b, and 103c into extrusion mold 110.

Figure 25:
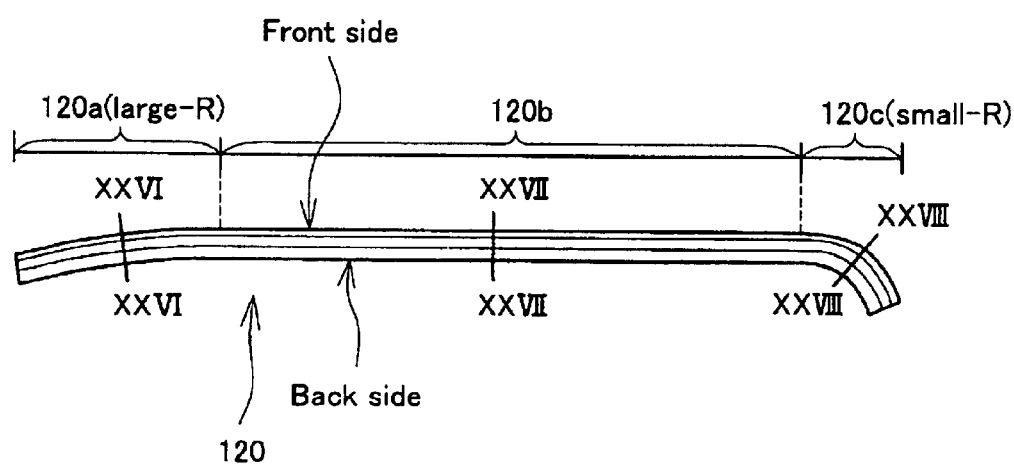
FIG. 25 is a side view that schematically shows the curved state of the molding relating to an embodiment of the present invention.

As shown in FIG. 25, which is a side view, molding 120 relating to the present embodiment is formed such that a large-R curved area 120a having a relatively small curvature (i.e., a large radius of curvature R), a linear molded area 120b maintaining a substantially linear shape, and a small-R curved area 120c having a relatively large curvature (i.e., a small radius of curvature R) are formed in that order, adjacent to each other in the longitudinal direction.

Figure 24:
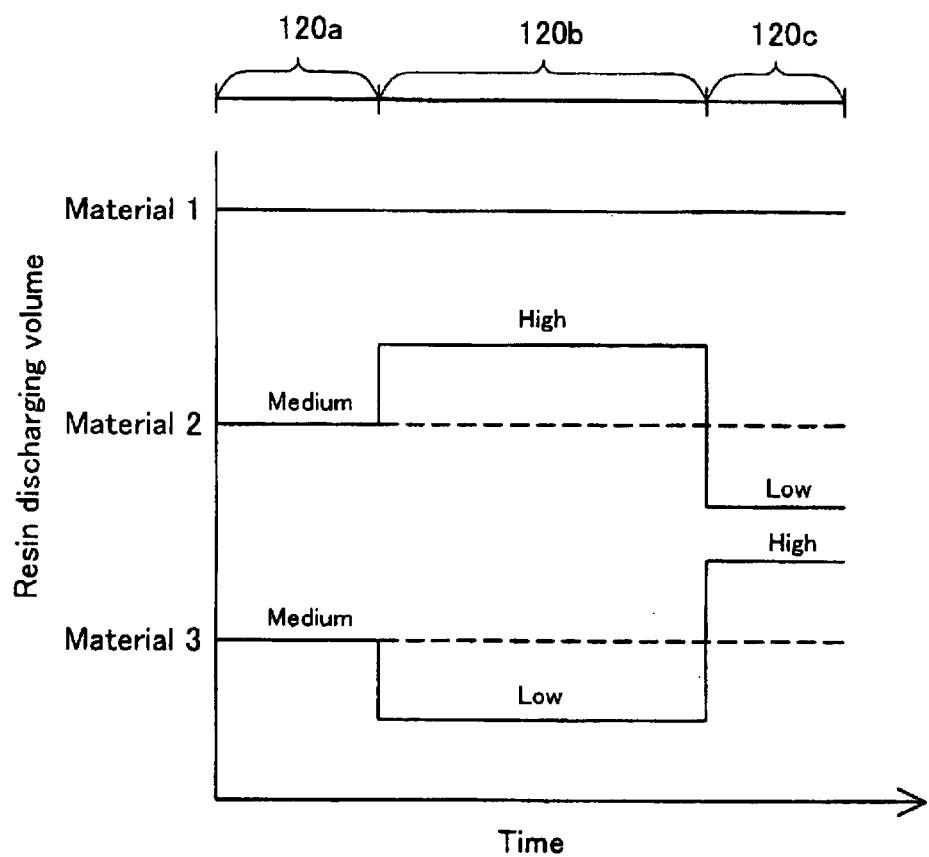
FIG. 24 is a chart that schematically shows the changes over time in the supplied volume of each molding material that is supplied into extrusion mold 10 relating to an embodiment.

As shown in the chart in FIG. 24, a large-R curved area manufacturing process is executed first based upon an operation signal from controller 102. That is, Material 1, Material 2, and Material 3 are supplied at predetermined flow rates into extrusion mold 110 by controlling the rotational speeds of the extrusion screws, which are not shown in the figure, of the three extruders 103a, 103b, and 103c, respectively, based upon a program that is pre-stored in the ROM. As a result, molding body 121 is extruded from extrusion port 111 and comprises individual molding materials positioned at predetermined locations and at the area proportions shown in FIG. 26, which is a cross-sectional view along the line XXVI—XXVI in FIG. 25.

Then, after a predetermined amount of time has elapsed, the large-R curved area manufacturing process is terminated, and at the same time, a linear molded area manufacturing process is started. First, the first change operation for adjusting the flow rates of Material 2 and Material 3 into extrusion mold 110 is executed based upon an operation signal from controller 102. That is, as shown in FIG. 24, the flow rate of Material 2 is increased and at the same time the flow rate of Material 3 is reduced. As a result, the supply volume of Material 2 per unit time becomes larger than the supply volume per unit time during the large-R curved area manufacturing process, and conversely, the supply volume of Material 3 per unit time becomes smaller than the supply volume per unit time during the large-R curved area manufacturing process. As a result, molding body 121 is extruded from extrusion port 111 and comprises individual molding materials positioned at predetermined locations and at the area proportions shown in FIG. 27, which is a cross-sectional view along the line XXVII—XXVII in FIG. 25.

Next, after a predetermined amount of time has elapsed, the linear molded area manufacturing process is terminated, and at the same time, a small-R curved area manufacturing process is started. First, the second change operation for again adjusting the flow rates of Material 2 and Material 3 into extrusion mold 110 is executed based upon an operation signal from controller 102. That is, as shown in FIG. 24, the flow rate of Material 2 is reduced further from the flow rate that was used during the large-R curved area manufacturing process, and at the same time, the flow rate of Material 3 is increased further from the flow rate that was using during the large-R curved area manufacturing process. As a result, the supply volume of Material 2 per unit time becomes smaller than the supply volume per unit time during the large-R curved area manufacturing process, and conversely, the supply volume of Material 3 per unit time becomes larger than the supply volume per unit time during the large-R curved area manufacturing process. As a result, molding body 121 is extruded from extrusion port 111 and comprises individual molding materials positioned at predetermined locations and at the area proportions shown in FIG. 28, which is a cross-sectional view along the line XXVIII—XXVIII in FIG. 25. Note that Material 1, which is supplied to form the design surface 122a, is always supplied into extrusion mold 110 at a constant flow rate throughout the aforementioned series of manufacturing processes.

As schematically shown in FIG. 22, molding body 121 is extruded from extrusion port 111 of manufacturing device 101 by sequentially executing these three manufacturing processes according to a predetermined cycle and is then guided to a cutting device 109 via a cooling device 107 and an extraction device 108. Then, molding body 121, which has been continuously extruded, is cut to a predetermined length by said cutting device 109. During this step, the controller 102 controls these devices 107, 108, and 109 in the same way as manufacturing device 101. In the present embodiment, the molding body is cut at a boundary between large-R curved area 120a and small-R curved area 120c.

In this way, according to manufacturing device 101, by sequentially executing the three manufacturing processes explained above according to a predetermined cycle, elongated molding 120 comprised of predetermined lengths of large-R curved area 120a, linear molded area 120b, and small-R curved area 120c adjacent to each other can be manufactured.

Figure 27:
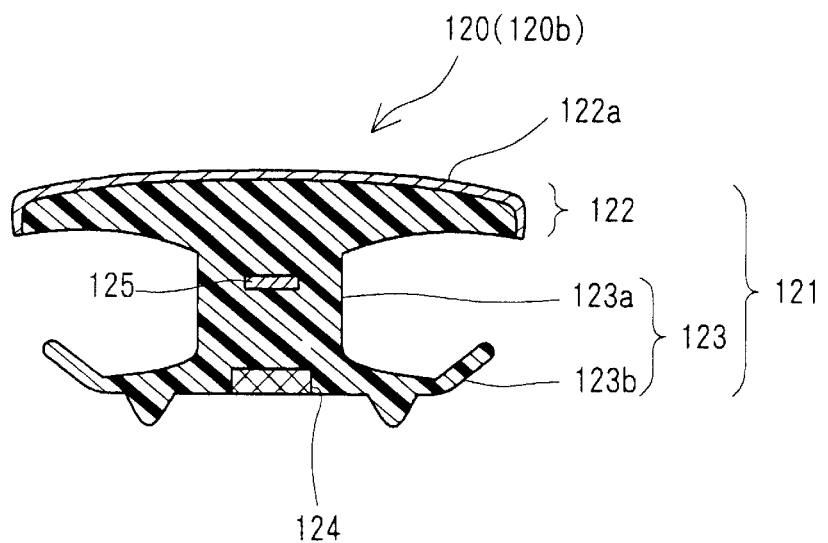
FIG. 27 is a cross-sectional view along the line XXVII—XXVII in FIG. 25.
Figure 28:
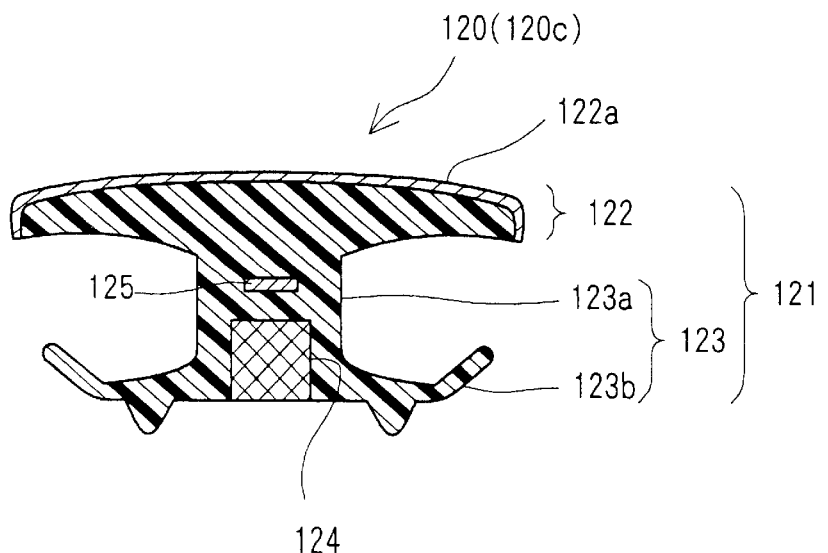
FIG. 28 is a cross-sectional view along the line XXVIII—XXVIII in FIG. 25.

Furthermore, in the present embodiment, the area proportions and locations of the individual materials are determined by taking the post-molding mold shrinkage rates of the individual materials into consideration beforehand. That is, as shown in FIGS. 26 through 28, Material 1 and Material 3, which have larger mold shrinkage rates than Material 2, are positioned in two mutually separate locations within the cross section of the molding body (design surface 122a and the bottom of mounting area 123), and as a result, the curvatures of the three parts can be varied from each other by varying their area proportions (i.e., contents). For example, in large-R curved area 120a shown in FIG. 26, the location and area proportion of high-shrinking resin area 124 within the cross section is set such that the post-molding mold shrinkage creates a curve having a relatively large radius of curvature R in the bottom direction of mounting area 123 (i.e., the back side shown in FIG. 25). In linear molded area 120b shown in FIG. 27, the post-molding mold shrinkage is set to cause the molding shrinkage effect of high-shrinking resin area 124 and the molding shrinkage effect of design surface 122a to exactly counteract each other. That is, in linear molded area 120b, the location and area proportion of high-shrinking resin area 124 within the cross section is set such that the mold shrinkage in the longitudinal direction is nearly uniform over the entire cross section of the molding body, and as a result, substantial linearity can be maintained even if molding shrinkage effect occurs. On the other hand, in small-R curved area 120c shown in FIG. 28, the location and area proportion of high-shrinking resin area 124 within the cross section is set such that the post-molding mold shrinkage creates a curve having a relatively small radius of curvature R in the bottom direction of mounting area 123 (i.e., the back side shown in FIG. 25).

In this way, after extrusion molding (typically after cooling), curved areas having different curvatures along the longitudinal direction as shown in FIG. 25 are formed. Therefore, when installing roof molding 120 relating to the present embodiment in roof area 52 (side grooves 52a) of vehicle 50 shown in FIG. 42, for example, by matching the small-R curved area 120c to part of the installation area having a contour of a relatively large curvature in the up-down directions close to the front window panel 53, the linear molded area 120b to the approximately linear installation area in the center of the roof, and the large-R curved area 120a to part of the installation area having a contour of a relatively small curvature close to the back of the roof, installation that accurately conforms to such a complicated contour can be achieved.

Although a preferred embodiment of the present invention relating to roof molding has been explained above with references to the drawings, the present invention is not limited to the aforementioned embodiment and can be applied to various kinds of applications.

For example, in the aforementioned embodiment, mutually different materials having approximately identical mold shrinkage rates (TPO materials with a high PP content in this case) are used for Material 1 and Material 3. However, this is not a requirement. For example, Material 1 and Material 3 may consist of exactly the same material. Even when such a single material (a TPO material with a high PP content in this case) is distributed and positioned in two locations that are separated from each other within the cross section of the molding body, curved areas having mutually different curvatures can be adjacently formed along the longitudinal direction by appropriately setting the location and area proportion of said single material within the cross section, in the same way as in the aforementioned embodiment.

Figure 29:
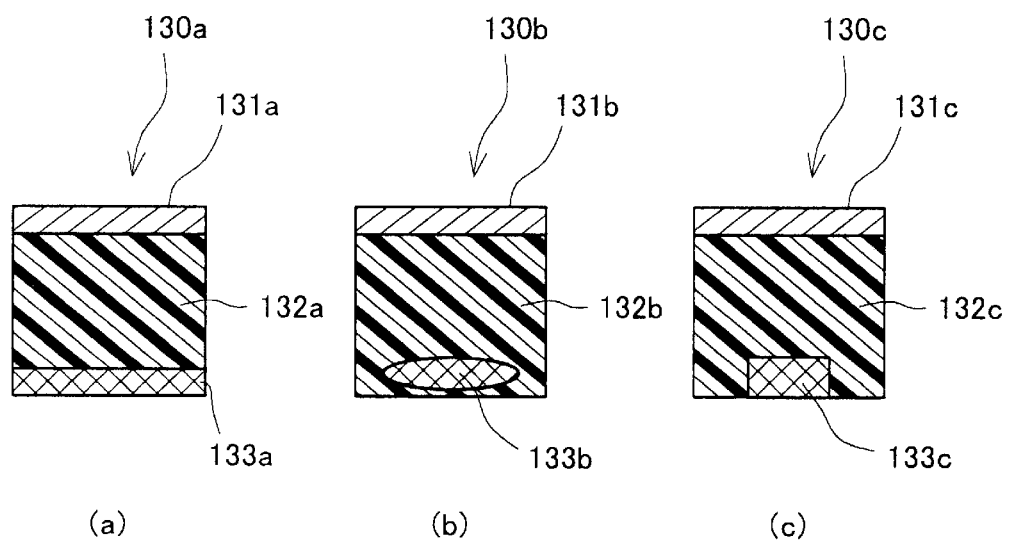
FIG. 29 (a), (b), and (c) are molding cross sections that schematically show good examples of the linear molded area that is formed by the present invention.

Furthermore, the locations of these molding materials are not particularly limited. For example, as shown in FIG. 29 which is a diagram schematically showing a molding example of a linear molded area, in elongated molding 130a, 130b, and 130c formed by positioning high-shrinkage molded members 131a, 131b, 131c, 133a, 133b, and 133c having relatively large mold shrinkage rates on the tops and bottoms of base molded members 132a, 132b, and 132c having relatively small mold shrinkage rates, as viewed from the cross section of the molding body, the locations and/or the area proportions of high-shrinkage molded members 133a, 133b, and 133c may be set as shown in (a), (b), or (c) in FIG. 29, as long as the mold shrinkage rates in the longitudinal direction are nearly uniform over the entire cross section such that an ideal linear molded area is formed.

Figure 30:
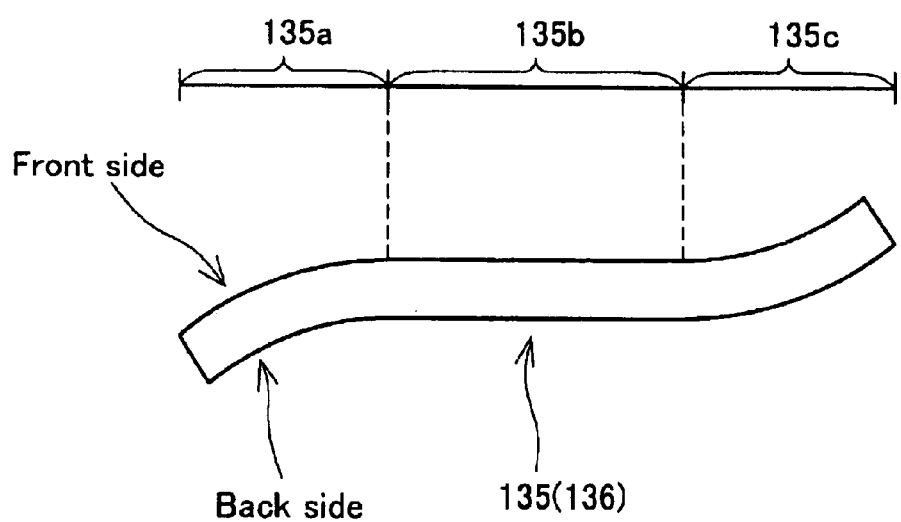
FIG. 30 is a side view that schematically shows the curved state of the molding relating to an embodiment of the present invention.
Figure 31:
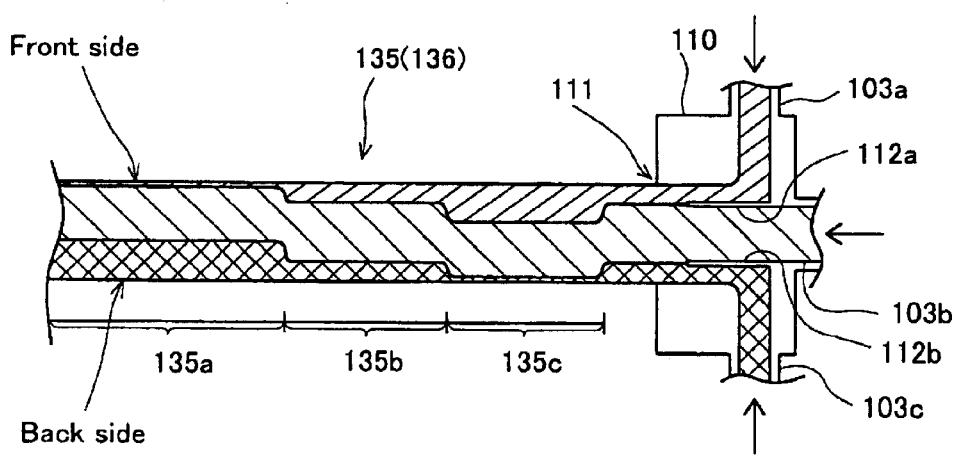
FIG. 31 is a cross-sectional view that schematically shows the internal structure of the molding relating to an embodiment of the present invention during extrusion molding.

Moreover, in the roof molding 120, curved areas 120a and 120c, which are curved in a predetermined direction (toward the bottom of mounting area 123 in this case), are formed by varying the flow rates of Material 2 and Material 3 as needed at predetermined timings while maintaining a constant flow rate of Material 1 (see FIG. 24). However, the curves are not limited to this embodiment. For example, molding that is bent in two opposite directions can be formed by varying the area proportions of the Material 1, Material 2, and Material 3 along the longitudinal direction in a embodiment different from what was described above. Such an embodiment will be explained below. Note that FIG. 30 is a side view that schematically shows the curved shape of molding 135 relating to the present embodiment. FIG. 31 is a cross-sectional view that schematically shows the internal structure of molding 135 extrusion-molded by manufacturing device 101.

As shown in FIG. 30, the molding 135 relating to the present embodiment has a three-dimensional shape that is a substantially S-shape curve and comprises a curved area 135a (hereafter referred to as "downward curved area 135a"), which is bent downward (toward the back side shown in FIG. 30) relative to the longitudinal direction of molding body 136, a curved area 135c (hereafter referred to as "upward curved area 135c") which is bent in the opposite direction (toward the front side shown in FIG. 30), and a linear molded area 135b which is formed between these curved areas 135a and 135c and which substantially maintains a linear shape. Such S-shaped molding 135 can also be ideally manufactured from Material 1, Material 2, and Material 3 using the manufacturing device 101.

As in the aforementioned embodiment, a downward curved area manufacturing process is first executed based upon an operation signal from controller 102. That is, Material 1, Material 2, and Material 3 are supplied at predetermined flow rates into extrusion mold 110 by controlling the rotational speeds of the extrusion screws, not shown in the figure, of the three extruders 103a, 103b, and 103c, respectively, based upon a program that is pre-stored in the ROM. As a result, molding body 136 comprised of individual molding materials positioned at predetermined locations and at the area proportion in the part indicated by symbol 135a in FIG. 31 is extruded from extrusion port 111. Then, after a predetermined amount of time has elapsed, the downward curved area manufacturing process is terminated, and at the same time, a linear molded area manufacturing process is started. First, the first change operation for adjusting the flow rates of Material 1, Material 2, and Material 3 into extrusion mold 110 is executed based upon an operation signal from controller 102. That is, as shown in FIG. 31, the flow rates of Material 1 and Material 3 are adjusted to be nearly equal. During this step, the flow rate of Material 2 is not changed. That is, the flow rate of Material 3 is reduced by the amount by which the flow rate of Material 1 is increased. As a result, molding body 136 comprised of individual molding materials positioned at predetermined locations and at the area proportion in the part indicated by symbol 135b in FIG. 31 is extruded from extrusion port 111.

Next, after a predetermined amount of time has elapsed, the linear molded area manufacturing process is terminated, and at the same time, an upward curved area manufacturing process is started. First, the second change operation for adjusting the flow rates of Material 1, Material 2, and Material 3 into extrusion mold 110 is executed based upon an operation signal from controller 102. That is, as shown in FIG. 31, the flow rate of Material 1 is further increased, and at the same time, the flow rate of Material 3 is further reduced. Note that the flow rate of Material 2 is not changed during this step, either. That is, the flow rate of Material 3 is further reduced by the amount by which the flow rate of Material 1 is further increased. As a result, molding body 136 comprised of individual molding materials positioned at predetermined locations and at the area proportion in the part indicated by symbol 135c in FIG. 31 is extruded from extrusion port 111. In this way, by sequentially executing the aforementioned three manufacturing processes according to a predetermined cycle, elongated molding 135 comprised of predetermined lengths of downward curved area 135a, linear molded area 135b, and upward curved area 135c adjacent to each other can be manufactured.

An example of forming a molding that is curved in two opposing directions (toward the front and back sides shown in FIG. 30 in this case) by varying each of the area proportions of Material 1, Material 2, and Material 3 along the longitudinal direction has been explained above. However, the means for forming such curves is not limited to such an embodiment.

Figure 32:
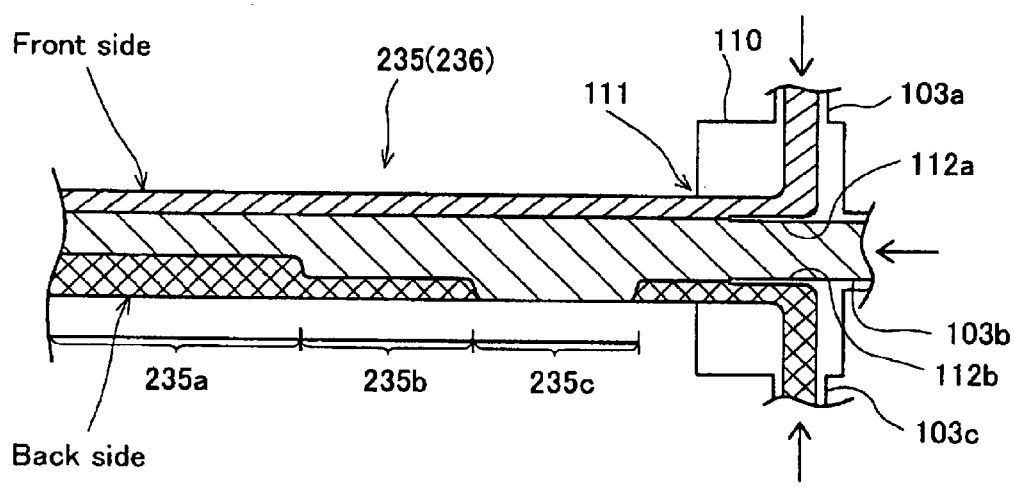
FIG. 32 is a cross-sectional view that schematically shows the internal structure of the molding relating to an embodiment of the present invention during extrusion molding.

For example, as shown in FIG. 32, molding 235, which can be curved in two opposing directions, can be formed by appropriately changing the flow rates of Material 2 and Material 3 at predetermined timings while maintaining a constant flow rate of Material 1. That is, in order to configure curved area 235a that is similar to the downward curved area 135a, Material 1, Material 2, and Material 3 are supplied into extrusion mold 110 at predetermined flow rates by controlling the rotational speeds of the extrusion screws, not shown in the figure, of the three extruders 103a, 103b, and 103c such that the flow rate of Material 1 becomes less than the flow rate of Material 3 which is positioned on the opposite side (the back side). As a result, molding body 236 comprised of individual molding materials positioned at predetermined locations and at the area proportions in the part indicated by symbol 235a in FIG. 32 is extruded from extrusion port 111. Next, after a predetermined amount of time has elapsed, the manufacturing process is terminated, and at the same time, the process for forming linear molded area 235b, which is similar to the linear molded area 135b, is started. That is, as the first change operation, the flow rates of Material 2 and Material 3 are changed while keeping the flow rate of Material 1 constant, such that the flow rates of Material 1 and Material 3 become nearly equal. As a result, molding body 236 comprised of individual molding materials positioned at predetermined locations and at the area proportions in the part indicated by symbol 235b in FIG. 32 is extruded from extrusion port 111. Next, after a predetermined amount of time has elapsed, the manufacturing process is terminated, and at the same time, the process for forming curved area 235c, which is similar to the upward curved area 135c, is started. That is, as the second change operation, the supply of Material 3 is stopped and the flow rate of Material 2 is increased while maintaining a constant flow rate of Material 1. That is, the flow rate of Material 2 is increased to compensate for the stopped supply of Material 3 such that the area proportion of Material 1 within the cross section remains constant before and after the second change operation. As a result, molding body 236 comprised of Material 1 and Material 2 positioned at predetermined locations and at the area proportions in the part indicated by symbol 235c in FIG. 32 is extruded from extrusion port 111.

In this way, in molding 235 comprised of said three parts 235a, 235b, and 235c, curved areas having different curvatures according to the locations and area proportions of Material 1, Material 2, and Material 3 within the cross section of the molding body are formed. That is, in the part indicated by symbol 235a where the area proportion of Material 3 is larger than that of Material 1, the molding curves toward the side (the back side) where Material 3 is located. In the part indicated by symbol 235b where Material 1 and Material 3 have nearly equal area proportions and are positioned at nearly symmetrical locations within the cross section, the molding maintains a nearly linear shape in the longitudinal direction. In the part indicated by symbol 235c where the area proportion of Material 3 is zero (i.e., Material 3 is not present), the molding curves toward the side (the front side) where Material 1 is located.

In this way, as in the embodiment shown in FIG. 30, by supplying Material 1 at a constant flow rate and adjusting the flow rates of the other materials (Material 2 and Material 3), including the stoppage and resumption of one of the materials, a molding 235 that is curved in two opposing directions can be manufactured.

Moreover, although plural so-called two-dimensional curved areas that curve only in one of two directions, i.e., one direction perpendicular to the longitudinal direction and the direction opposite from said one direction, are formed in molding 120 and molding 135 relating to the aforementioned embodiments, the second or third molding of the present invention is not limited to one having such two-dimensional curved areas. For example, three-dimensional curved areas that are curved or twisted in the desired directions in the transverse directions relative to the longitudinal direction can be formed by positioning in part of back surface 142c of molding body 141 having a square cross-sectional shape as shown in FIG. 33 and in top surface 142a which is not in contact with said back surface 142c, molding materials having larger mold shrinkage rates than the molding material comprising body 142b, excluding said back surface 142c and top surface 142a, and by appropriately varying the area proportions of these molding materials along the longitudinal direction.

Figure 33:
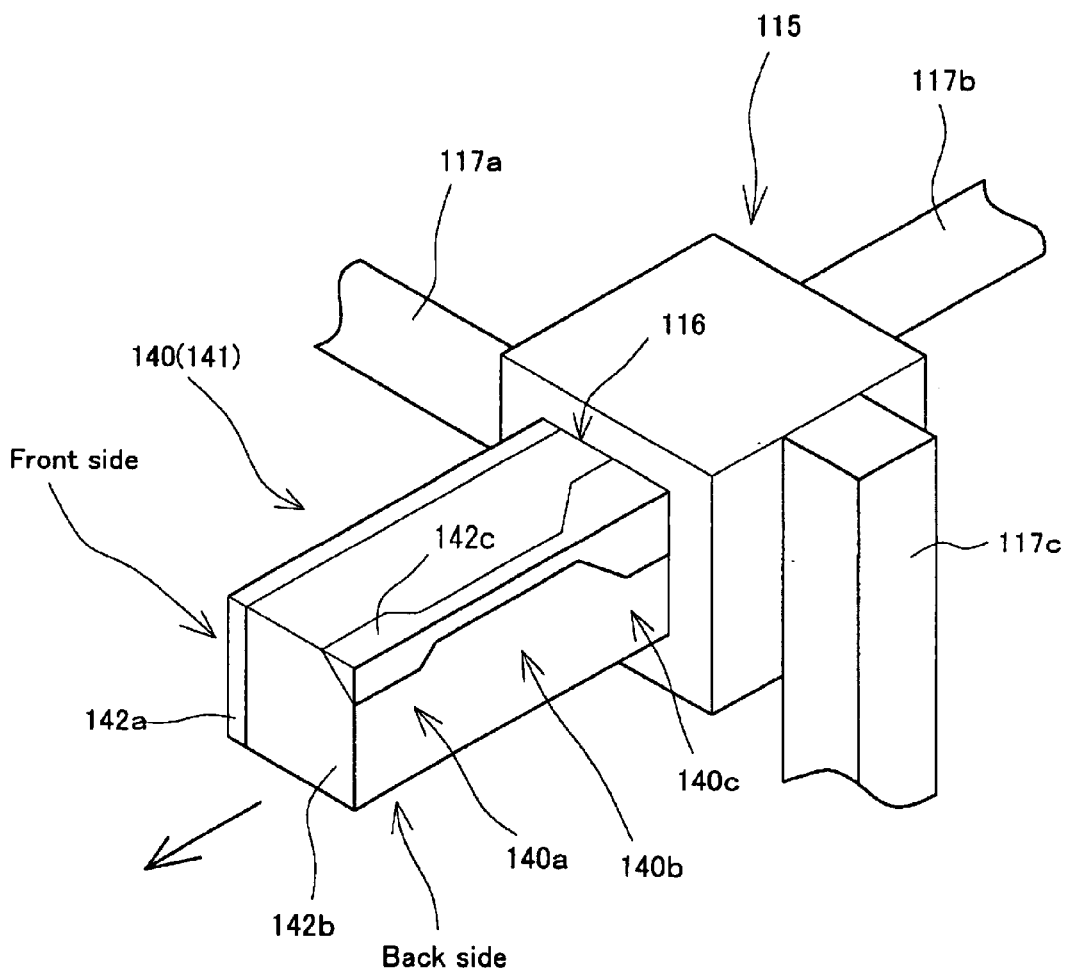
FIG. 33 is a perspective diagram that schematically shows the significant portions of the molding manufacturing device relating to an embodiment of the present invention.

That is, the molding material for forming the top surface, the molding material for forming the body, and the molding material for forming the back side are supplied from first extruder 117a, second extruder 117b, and third extruder 117c, respectively, which are connected to extrusion mold 115 shown in FIG. 33. Although no particular restrictions are placed on materials, the same TPO material that is characterized by having a relatively large mold shrinkage rate is used for the molding material for forming the top surface and the molding material for forming the back side. Meanwhile, a TPO material having a relatively smaller mold shrinkage rate is used for the molding material for forming the body.

Moreover, as in the aforementioned embodiments, molding body 141 comprised of individual molding materials supplied into mold 115 at predetermined flow rates is extruded from extrusion port 116. Then, at a predetermined timing, the flow rate of the molding material for forming the body, supplied from second extruder 117b, and the flow rate of the molding material for forming the back side, supplied from third extruder 117c, are adjusted. That is, the first change operation is performed to increase the flow rate of the molding material for forming the body, and at the same time, to reduce the flow rate of the molding material for forming the back side accordingly at a predetermined timing. At a different timing, the second change operation is performed to reduce the flow rate of the molding material for forming the body, and at the same time, to increase the flow rate of the molding material for forming the back side accordingly. Note that, in this case, the flow rate of the molding material for forming the top surface, supplied from first extruder 117a, is kept constant during the extrusion molding.

In this way, three parts having three mutually different area proportions between the body molded area comprised of the molding material for forming the body and the back-side molded area comprised of the molding material for forming the back side, as indicated by symbols 140a, 140b, and 140c in FIG. 33, can be alternately formed in the longitudinal direction.

Figure 34:
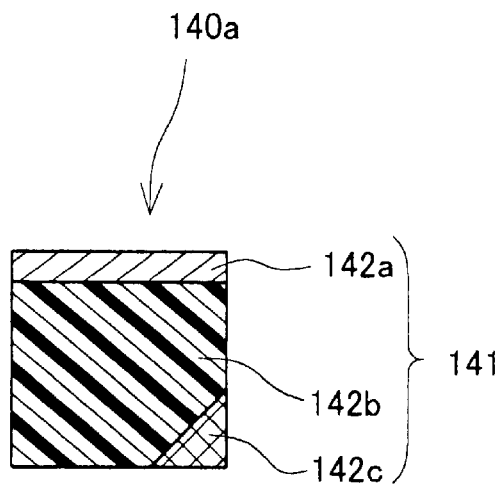
FIG. 34 is a cross-sectional view that schematically shows the internal structure of a curved area of the molding relating to an embodiment of the present invention.
Figure 35:
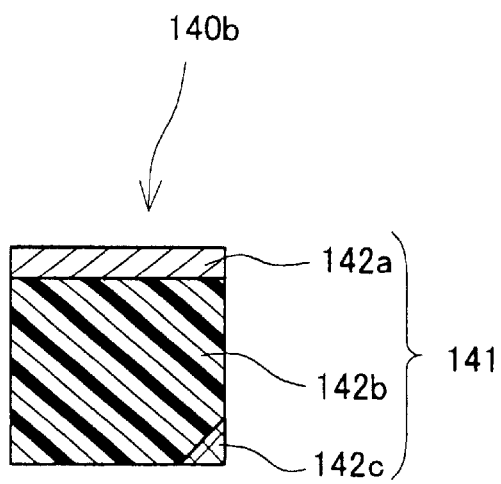
FIG. 35 is a cross-sectional view that schematically shows the internal structure of a curved area of the molding relating to an embodiment of the present invention.
Figure 36:
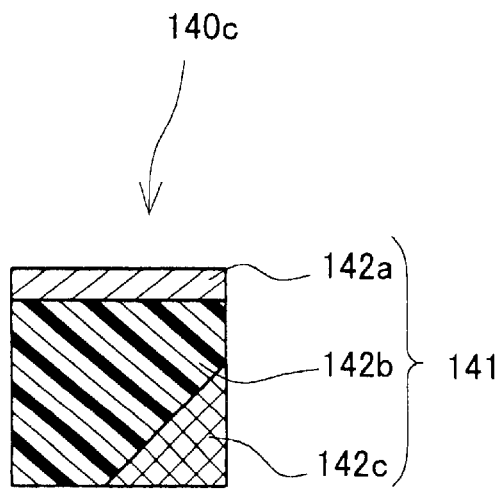
FIG. 36 is a cross-sectional view that schematically shows the internal structure of a curved area of the molding relating to an embodiment of the present invention.

Two or three or more curved areas having mutually different bending directions and curvatures are formed adjacently by means of extrusion molding accompanied by such first and second change operations, and as a result, molding 140 exhibiting three-dimensional curvatures can be manufactured. That is, as shown in FIGS. 34, 35, and 36, which are cross-sectional views of the parts indicated by symbols 140a, 140b, and 140c, respectively, in FIG. 33, the degree and direction of the bend in each part can be varied by varying the area proportion of back surface 142c comprised of a plastic molded member having a relatively large mold shrinkage rate within the cross section. For example, in part 140a configured with the area proportion shown in FIG. 34, the molding shrinkage effects exerted on the molding shrinkage of the entire molding body 141 by top surface 142a and by back surface 142c nearly counteract each other. Consequently, in this part 140a, molding body 141 curves in the direction of the side surface that is sandwiched between top surface 142a and back surface 142c or a direction close to it (the rightward direction or a direction that is somewhat offset from it toward the top in FIG. 34). On the other hand, in part 140b configured with the area proportion shown in FIG. 35, the molding shrinkage effect exerted on the molding shrinkage of the entire molding body 141 by top surface 142a overcomes the molding shrinkage effect of back surface 142c, and as a result, molding body 141 curves in the direction of top surface 142a or a direction close to it (a nearly upward direction or a direction that is somewhat offset from it toward the right side in FIG. 35). In contrast, in part 140c configured with the area proportion shown in FIG. 36, the molding shrinkage effect exerted on the molding shrinkage of the entire molding body 141 by back surface 142c overcomes the molding shrinkage effect of top surface 142a, and as a result, molding body 141 curves in the direction of back surface 142c (the direction nearly toward the right bottom in FIG. 36).

As explained above, by distributing and positioning a molding material having a larger mold shrinkage rate than other molding materials in two or more locations (two locations in the present embodiment) that are separated from each other within the cross section of the molding body and by performing a change operation for varying the area proportion within the cross section of the molding body at one of these locations along the longitudinal direction, a molding 140 exhibiting three-dimensional curvatures, in which two or three or more curved areas 140a, 140b, and 140c having mutually different bending directions and curvatures are adjacently formed, can be manufactured.

Several manufacturing examples have been explained above, in which the second or third molding of the present invention is manufactured by varying the area proportions of the plastic molded members comprising the molding body within the cross section. However, the second molding of the present invention can also be obtained not only by varying the area proportion as explained above, but also by varying the locations along the longitudinal direction.

Figure 37:
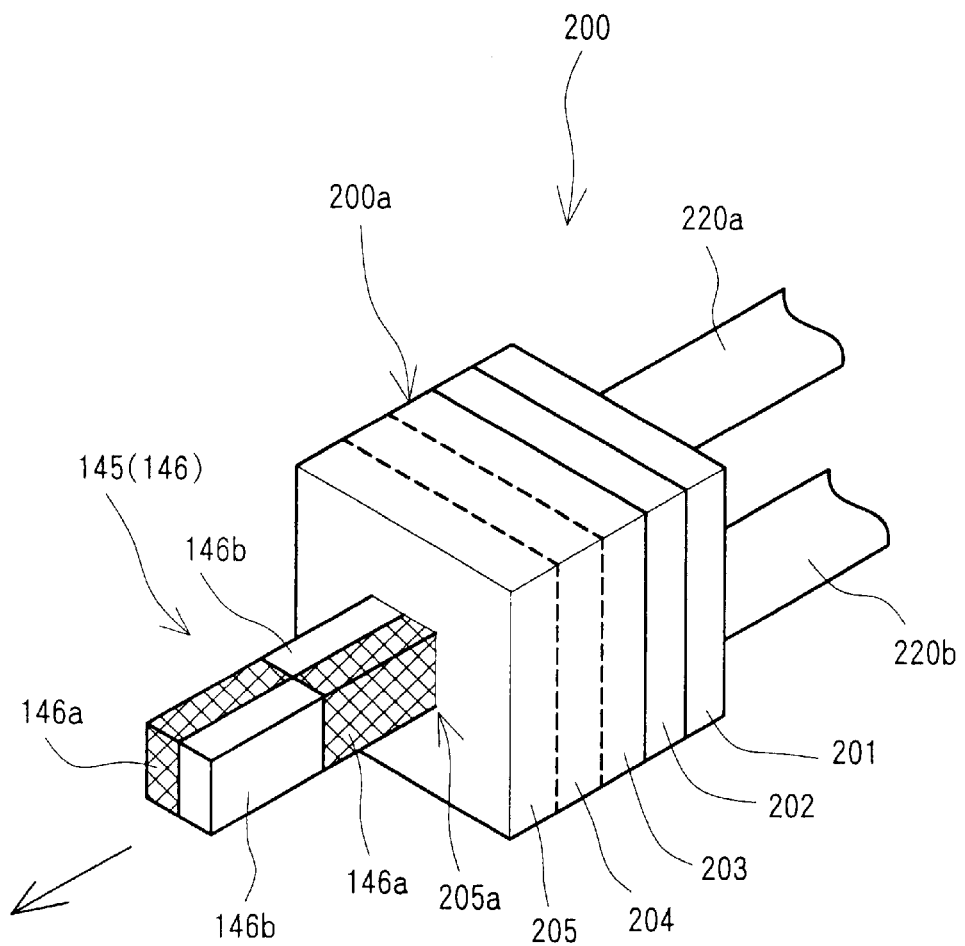
FIG. 37 is a perspective diagram that schematically shows the significant portions of the molding manufacturing device relating to an embodiment of the present invention.

For example, a manufacturing device equipped with an extrusion mold (die) schematically shown in FIG. 37 can be used to vary the individual locations of two or three or more plastic molded members comprising the molding body along the longitudinal direction. This concept will be explained in detail below.

As shown in FIG. 37, in manufacturing device 200 relating to the present embodiment, a first extruder 220a which supplies a first molding material (a TPO material with a high PP content in this case) having a relatively large post-molding mold shrinkage rate and a second extruder 220b which supplies a second molding material (a TPO material with a low PP content in this case) having a relatively large post-molding mold shrinkage rate are connected to connection area 201 of extrusion mold 200a.

Figure 38:
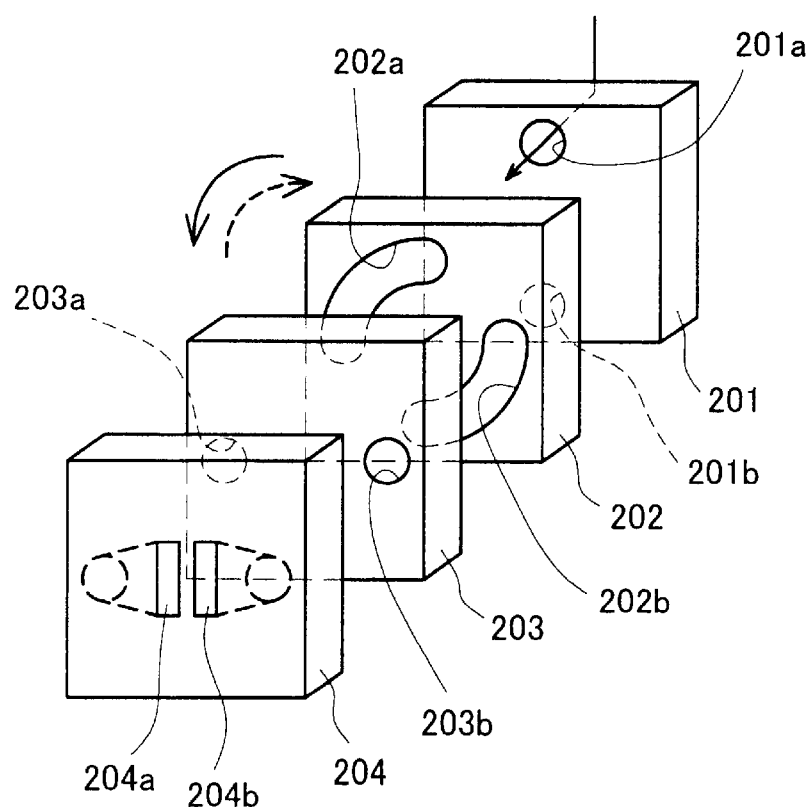
FIG. 38 is an exploded perspective diagram that schematically shows the extrusion mold of the molding manufacturing device relating to an embodiment of the present invention.

On the other hand, as shown in FIG. 37 and FIG. 38, which is an exploded perspective diagram of part of FIG. 37, this extrusion mold 200a comprises five parts having different functions. That is, an extrusion area 205, in which an extrusion port 205a having a predetermined shape (a square shape in this case) and a main channel (not shown in the figure) inside said extrusion port 205a are formed, is provided; and a connection area 201, a switching area 202, a linking area 203, and a discharge area 204 are provided on the upstream side of said extrusion area 205.

As shown in FIG. 38, a pair of molding material supply routes 201a and 201b are formed in the vertical direction in the connection area 201 such that they are connected to the two extruders 220a and 220b, respectively. That is, the first molding material is fed into molding material supply route 201a located on the top in the figure from first extruder 220a while the second molding material is fed into molding material supply route 201b located on the bottom from second extruder 220b. Meanwhile, a pair of molding material transfer routes 203a and 203b is formed in the horizontal direction in FIG. 38 in linking area 203 positioned across switching area 202, which will be described below. Moreover, discharge area 204 is provided with a pair of discharge ports 204a and 204b that are connected to said pair of molding material transfer routes 203a and 203b, respectively, and is positioned on the downstream side. As a result, the molding materials flowing from the pair of molding material transfer routes 203a and 203b of linking area 203 are supplied from said discharge ports 204a and 204b, respectively, into the main channel (not shown in the figure) inside extrusion area 205. Then, the first molding material and second molding material merge according to their predetermined flow rates inside said main channel, and are extruded from extrusion port 205a.

During this process, the switching area 202 is positioned between connection area 201 and linking area 202, and as a result, in this extrusion mold 200a, the molding materials to be discharged from the discharge ports 204a and 204b can be alternated between the first molding material and second molding material. This is further described below.

As shown in FIG. 38, switching area 202 relating to the present embodiment is provided with a pair of switching channels 202a and 202b formed in circular arc shapes for connecting the pair of molding material supply routes 201a and 201b, respectively, in the connection area 201 to the pair of molding material transfer routes 203a and 203b in the linking area 203. That is, in the state shown in FIG. 38, molding material supply route 201a on the top is connected to molding material transfer route 203a on the left side of the figure (hereafter referred to as "first transfer route 203a") via one of the switching channels, i.e., 202a, (hereafter referred to as "first switching channel 202a"). On the other hand, molding material supply route 201b on the bottom is connected to molding material transfer route 203b on the right side of the figure (hereafter referred to as "second transfer route 203b") via the other switching channel 202b (hereafter referred to as "second switching channel 202b").

Specifically, in the state shown in FIG. 38, the first molding material supplied from first extruder 220a goes through the top molding material supply route 201a, first switching channel 202a, and first transfer route 203a, and is discharged into the main channel from discharge port 204a on the left side of the figure. On the other hand, the second molding material supplied from second extruder 220b goes through the bottom molding material supply route 201b, second switching channel 202b, and second transfer route 203b, and is discharged into the main channel from discharge port 204b on the right side of the figure.

By the way, switching area 202 relating to the present embodiment is installed via a rotation mechanism (not shown in the figure) such that it can be reversibly rotated by 90 degrees to the right relative to the extrusion direction from the state shown in FIG. 38. Because of this arrangement, the molding materials flowing through first transfer route 203a and second transfer route 203b can be alternated as desired.

That is, by rotating switching area 202 by 90 degrees to the right relative to the extrusion direction from the state shown in FIG. 38 (i.e., in the direction of the solid arrow in the figure), the top molding material supply route 201a becomes connected to second transfer route 203b via second switching channel 202b, conversely, the bottom molding material supply route 201b becomes connected to first transfer route 203a via first switching channel 202a. As a result, the first molding material supplied from first extruder 220a is discharged into the main channel from discharge port 204b on the right side of the figure via the top molding material supply route 201a, second switching channel 202b, and second transfer route 203b. Meanwhile, the second molding material supplied from second extruder 220b is discharged into the main channel from discharge port 204a on the left side of the figure via the bottom molding material supply route 201b, first switching channel 202a, and first transfer route 203a.

Then, by rotating switching area 202 by 90 degrees to the left relative to the extrusion direction (i.e., in the direction of the dotted arrow in the figure) at a predetermined timing, switching area 202 is positioned at the original location as shown in FIG. 38. Because of this arrangement, the first molding material is again discharged into the main channel from discharge port 204a on the left side and the second molding material is discharged into the main channel from discharge port 204b on the left side, as described above.

In this way, in manufacturing device 200 relating to the present embodiment, by rotating switching area 202 of extrusion mold 200a by 90 degrees at predetermined timing, the channels for the individual molding materials to be supplied in the main channel from the individual discharge ports 204a and 204b can be switched. Consequently, when the supply volumes (flow rates) from first extruder 220a and second extruder 220b are set to be equal, for example, molding body 146, whose cross section consists of nearly equal halves of high-shrinkage resin 146a comprised of the first molding material and having a relatively large mold shrinkage rate and low-shrinkage resin 146b comprised of the second molding material and having a relatively small mold shrinkage rate as shown in FIG. 37, is extruded from extrusion port 205a. Here, by rotating switching area 202 by 90 degrees at predetermined timing, the channels for these two molding materials are alternated, and as a result, the locations of high-shrinkage resin 146a and low-shrinkage resin 146b can be reversed by nearly 180 degrees following said rotation operation, as shown in FIG. 37.

Figure 39:
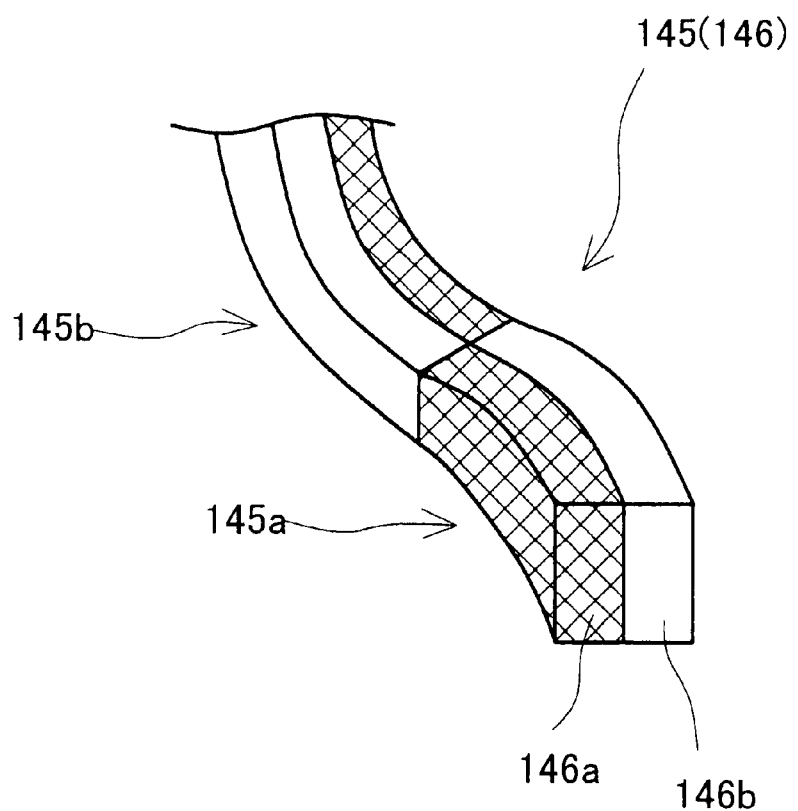
FIG. 39 is a perspective diagram that schematically shows the molding relating to an embodiment of the present invention.

Moreover, molding 145 thus obtained curves toward high-shrinkage resin 146a because of the molding shrinkage effect after extrusion molding, and as a result, as schematically shown in FIG. 39, an S-shaped three-dimensional structure comprised of two adjacent curved areas 145a and 145b, which are curved in mutually different directions, is formed.

Figure 40:
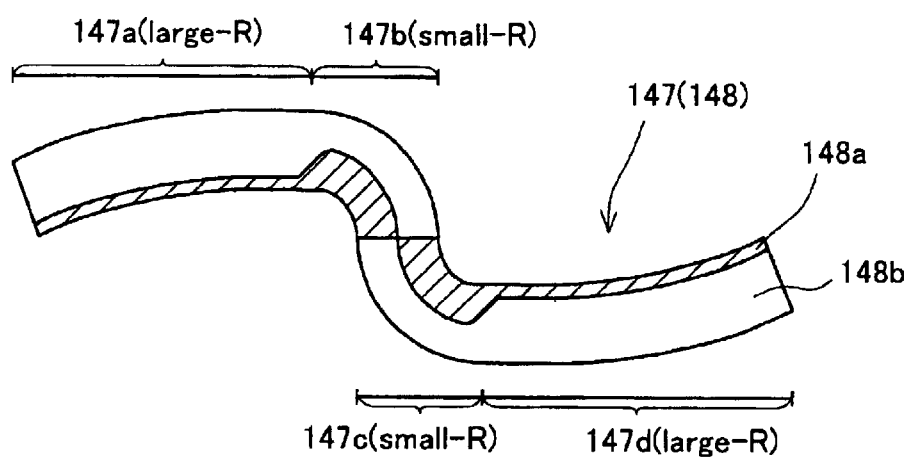
FIG. 40 is a top view that schematically shows the molding relating to an embodiment of the present invention.

Note that, in the aforementioned embodiment, curved areas having different bending directions are formed by reversing the locations of the two molding materials within the cross section of the molding body by rotating the switching area by 90 degrees. Besides this location rotation, it is also possible to form curved areas having different curvatures and bending directions by adjusting the supply volumes of the molding materials as shown in FIG. 24. For example, first, the supply volume (flow rate) of the first molding material is set low while the supply volume (flow rate) of the second molding material is set high, as schematically shown in FIG. 40. In this state, as in the part indicated by symbol 147a in FIG. 40, a part is formed in which high-shrinkage resin 148a comprised of the first molding material is positioned only on one side, as viewed from the cross section of molding body 148, and in which low-shrinkage resin 148b comprised of the second molding material is positioned in the remaining area. Next, the supply volumes are adjusted to equalize the flow rates of the first molding material and the second molding material. As a result, molding body 148, whose cross section consists of nearly equal volumes of high-shrinkage resin 148a and low-shrinkage resin 148b, as in the part indicated by symbol 147b in FIG. 40, is extruded from extrusion port 205a. Then, by rotating the switching area 202 at predetermined timing, molding body 148 in whose cross section high-shrinkage resin 148a and low-shrinkage resin 148b are reversed, as in the part indicated by symbol 147c in FIG. 40, is extruded from extrusion port 205a. Subsequently at a predetermined timing, the supply volume of the first molding material is set low again while the supply volume of the second molding material is set high. As a result, a part is formed in which high-shrinkage resin 148a is positioned on the opposite side from the part indicated by symbol 147a as viewed from the cross section of molding body 148, and in which low-shrinkage resin 148b is positioned in the remaining area, as in the part indicated by symbol 147d in FIG. 40.

In this way, in molding 147 obtained by varying the timings of the switching area 202 rotation operation and of the supply volume (flow rate) adjustment operation, curved areas 147b and 147c having different bending directions can be formed adjacently along the longitudinal direction, and furthermore, curved areas 147a and 147d having relatively small curvatures (in which radius of curvature R is large) and curved areas 147b and 147c having relatively large curvatures (in which radius of curvature R is small) can be formed adjacently along the longitudinal direction.

As explained above, by changing the locations and area proportions of two or more molding materials comprising the molding body and having mutually different mold shrinkage rates within the cross section of the molding body, curved areas having different bending directions and curvatures can be formed in the longitudinal direction as desired. Consequently, the present invention can provide molding that accurately conforms to the contour of the installation area, such as a vehicle roof.

Although several preferred embodiments relating to the second or third molding of the present invention and a manufacturing method thereof have been explained above, the present invention is not limited to these embodiments.

Although the molding body is formed using two or more types of TPO materials having different mold shrinkage rates (i.e., TPO materials having mutually different PP contents) in the aforementioned embodiments, materials to be used are not limited to these TPO materials; and other synthetic resin materials may also be used as long as they have different mold shrinkage rates. For example, two or more kinds of synthetic resins containing mutually different filler (glass fiber, etc.) contents (i.e., resin materials that use the same matrix formation material) may be used.

Furthermore, in the aforementioned embodiments, the area proportions of individual molding materials comprising the molding body within its cross section are varied by directly adjusting the flow rates of the individual molding materials to be supplied to the extrusion mold by changing the screw rotational speeds of the extruders. However, such a means is not the only one that can be used. For example, in addition to employing screw-type extruders, it is also possible to provide discharge holes that can be freely opened and closed and which are used for discharging the molding materials to be supplied into the mold from said screw-type extruders, in the extrusion mold and/or part of the supply tubes connected to said mold. With this arrangement, it is possible to reduce the supply pressures (transfer flow rates) of the molding materials to be supplied into the mold from said screw-type extruders, by keeping the screw rotational speeds of said screw-type extruders constant and opening said discharge holes as needed, and as a result, it is possible to adjust the flow rates of the individual molding materials to be supplied to the extrusion mold, just as with the operation for changing the screw rotational speeds.

Alternatively, if a so-called ram-type extruder or accumulator-type extruder is used instead of a screw-type extruder, by adjusting the extrusion capacity of the rams (typically, hydraulic rams) for extruding the molding materials into the mold from said extruders, it is possible to adjust the flow rates of the individual molding materials to be supplied to the extrusion mold, just as with the operation for changing the screw rotational speeds.

Figure 41:
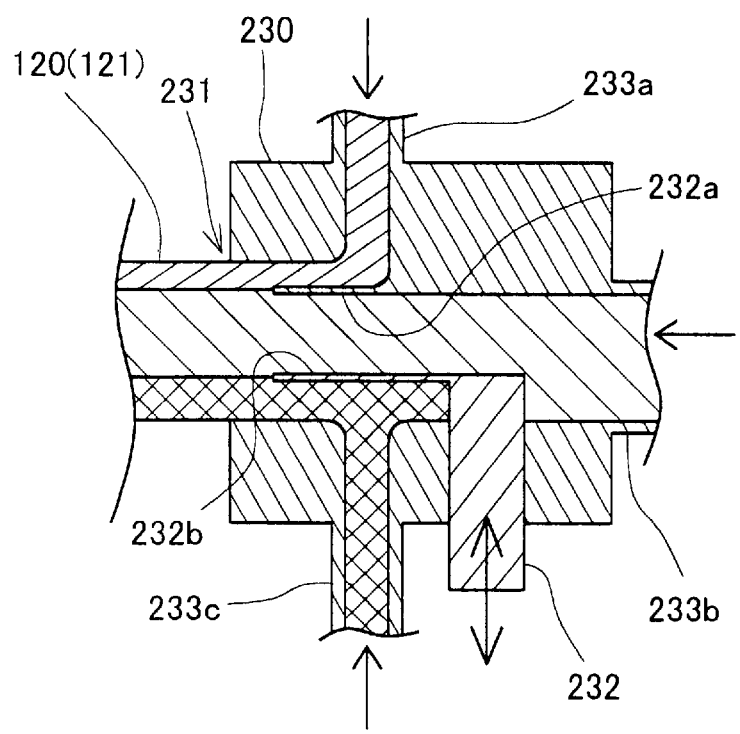
FIG. 41 is an exploded perspective diagram that schematically shows the extrusion mold of the molding manufacturing device relating to an embodiment of the present invention.

Alternatively as shown in FIG. 41, it is possible to easily vary the area proportions by movably installing partition 232b (i.e., at least one of partitions 232a and 232b inside extrusion mold 230) and moving said partition 232b in addition to changing the screw rotational speeds of first extruder 233a, second extruder 233b, and third extruder 233c. For example, by appropriately moving movable area 232 formed integrally with partition 232b as shown in FIG. 41, it is possible to adjust the sizes of the channels for the individual molding materials to be supplied from second extruder 233b and third extruder 233c immediately prior to extrusion port 231. As a result, it is possible to easily adjust the area proportions of the individual molding materials to be extruded from extrusion port 231.

Moreover, as long as the molding of the present invention can be manufactured or as long as the molding manufacturing method of the present invention can be implemented, it is acceptable to install additional devices or mechanisms (e.g., a cutting instrument, such as a cutter, movably installed for cutting away part of the decorative area) in the molding manufacturing device of the present invention relating to the aforementioned embodiments, or to modify the mechanisms explained in this Specification.

Furthermore, although the molding is manufactured based upon a typical extrusion molding technique in the aforementioned embodiments, any molding that is manufactured without the use of such techniques can be included in the molding of the present invention as long as it has the characteristics described above.

Although embodiments of the present invention have been explained in detail above, these are merely examples, and the present invention can be implemented in embodiments in which various modifications or improvements have been applied based upon the knowledge of those skilled in the art.

What is claimed is:

1. An elongated molding comprising:
   a primary plastic molded member;
   another or two or more plastic molded members which have mutually different mold shrinkage rates and which are harder than said primary plastic molded member; and
   a molding body having two or more curved areas having mutually different curvatures formed adjacently to each other in the longitudinal direction, the molding body being formed by joining, in at least some parts in its longitudinal direction, said primary plastic molded member and other plastic molded members, wherein said other plastic molded members are embedded along the longitudinal direction of the primary plastic molded member, and wherein the embedding positions of said other plastic molded members are varied such that the relative positions of the other plastic molded members, which can be seen in the cross section of the molding body, differ between two adjacent curved areas among said two or more curved areas.

2. An elongated molding comprising:
   a primary plastic molded member;
   another or two or more plastic molded members which have mutually different mold shrinkage rates and which are comprised of materials having a larger molding shrinkage rate than the material for forming the primary plastic molded member; and
   a molding body having two or more curved areas having mutually different curvatures formed adjacently to each other in the longitudinal direction, the molding body being formed by joining, in at least some parts in its longitudinal direction, said primary plastic molded member and other plastic molded members, wherein said other plastic molded members are embedded along the longitudinal direction of the primary plastic molded member, and wherein the embedding positions of said other plastic molded members are varied such that the relative positions of the other plastic molded members, which can be seen in the cross section of the molding body, differ between two adjacent curved areas among said two or more curved areas.

3. A molding according to claim 2, wherein at least some parts of the molding body in the longitudinal direction are curved or bent in the direction in which the aforementioned other plastic molded member is offset, as viewed in the cross section of the molding body.

4. An elongated molding comprising:
   two or more plastic molded members having mutually different mold shrinkage rates; and
   a molding body having two or more curved areas having mutually different curvatures formed adjacently to each other in the longitudinal direction, the molding body being formed by joining, in at least some parts in its longitudinal direction, said two or more plastic molded members, wherein
   the locations and/or area proportions of the two or more plastic molded members in the cross section of the molding body vary between two adjacent curved areas among said two or more curved areas, and wherein between at least one pair of adjacent curved areas among the curved areas, one of the two or more plastic molded members is distributed and positioned in two or more locations that are separated from each other, and the area proportion of said one plastic molded member in at least one location of said two or more locations, in the cross section of the molding body, is different between said two adjacent curved areas.

5. A molding according to claim 4, wherein the molding body is configured by joining the two or more plastic molded members in the longitudinal direction over its entire length.

6. A molding according to claim 4, wherein at least one of the curved areas forms a linear molded part that maintains a substantially linear shape in the longitudinal direction.

7. An elongated molding comprising:
   two or more plastic molded members having mutually different mold shrinkage rates; and
   a molding body having two or more curved areas having mutually different curvatures formed adjacently to each other in the longitudinal direction, the molding body being formed by joining, in at least some parts in its longitudinal direction, said two or more plastic molded members, wherein
   between at least one pair of adjacent curved areas among the curved areas, the area proportions of at least two of the two or more plastic molded members in the cross section of the molding body are substantially the same, and the locations of said at least two plastic molded members in the cross section of the molding body are different from each other.

8. An elongated molding according to claim 7, wherein between at least one pair of adjacent curved areas among the curved areas,
   two or more plastic molded members contain a first plastic molded member having a relatively large molding shrinkage rate and a second plastic molded member having a relatively small molding shrinkage rate, and
   the locations of said first and second plastic molded members in the cross section of the molding body in said two adjacent curved areas are offset by 180 degrees from each other between said two curved areas, as viewed in said cross section.

9. An elongated molding, comprising:
   a primary plastic molded member;
   another or two or more plastic molded members which have mutually different and relatively large mold shrinkage rates and which are harder than said primary plastic molded member; and
   a molding body having a linearly molded area that substantially maintains a linear shape in the longitudinal direction, said molding body being formed by joining, in at least some parts in its longitudinal direction, said primary plastic molded member and other plastic molded members, wherein
   one or more of said other plastic molded members are distributed and positioned in two or more locations that are separated from each other in said linearly molded area such that the molding shrinkage rate in said linearly molded area in the longitudinal direction is nearly uniform in the cross section of the molding body.

* * * * *